US010015797B2

(12) United States Patent
Moses et al.

(10) Patent No.: US 10,015,797 B2
(45) Date of Patent: Jul. 3, 2018

(54) APPARATUS, SYSTEM AND METHOD OF SELECTIVELY PROVIDING INTERNET PROTOCOL (IP) SESSION CONTINUITY

(71) Applicant: Intel IP Corporation, Santa Clara, CA (US)

(72) Inventors: Danny Moses, Reut (IL); Muthaiah Venkatachalam, Beaverton, OR (US); Hassnaa Moustafa, Portland, OR (US); Meghashree Dattatri Kedalagudde, Hillsboro, OR (US); Wu-Chi Feng, Tigard, OR (US); Vallabhajosyula Srinivasa Somayazulu, Portland, OR (US); Alexandre Saso Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 635 days.

(21) Appl. No.: 14/316,825

(22) Filed: Jun. 27, 2014

(65) Prior Publication Data
US 2015/0029956 A1    Jan. 29, 2015

Related U.S. Application Data

(60) Provisional application No. 61/859,121, filed on Jul. 26, 2013.

(51) Int. Cl.
*H04W 76/02* (2009.01)
*H04W 72/08* (2009.01)
(Continued)

(52) U.S. Cl.
CPC .......... *H04W 72/082* (2013.01); *H01Q 1/243* (2013.01); *H01Q 3/00* (2013.01);
(Continued)

(58) Field of Classification Search
CPC . H04W 76/021; H04W 76/046; H04W 76/02; H04W 4/005; H04W 16/28; H04W 36/0066
(Continued)

(56) References Cited

U.S. PATENT DOCUMENTS 6,647,001 B1    11/2003  Bhagavath et al.
6,687,252 B1 *   2/2004  Bertrand ........... H04L 29/12283
                                                              370/352
(Continued)

FOREIGN PATENT DOCUMENTS

CN       101047648       10/2007
EP         2413632        2/2012
(Continued)

OTHER PUBLICATIONS

International Preliminary Report on Patentability for PCT/US2014/048110, dated Feb. 4, 2016, 8 pages.
(Continued)

*Primary Examiner* — Jae Y Lee
*Assistant Examiner* — Jean F Voltaire
(74) *Attorney, Agent, or Firm* — Shichrur & Co.

(57) ABSTRACT

Some demonstrative embodiments include devices, systems of selectively providing Internet Protocol (IP) session continuity. In one example, a mobile device may include a radio to communicate with a wireless network, the radio to transmit a session setup request to setup a communication session, and to receive a session setup response in response to the session setup request, the session setup response including a first Internet Protocol (IP) address and a second IP address assigned to the communication session, and an indication that the first IP address is configured to maintain IP session continuity; and a controller to select to use the first IP address for the communication session, if IP session (Continued)

continuity is to be maintained for the communication session, and to select to use the second IP address for the communication session, if IP session continuity is not to be maintained for the communication session.

25 Claims, 8 Drawing Sheets

(51) Int. Cl.

| | |
|---|---|
| H04W 52/02 | (2009.01) |
| H04W 4/00 | (2018.01) |
| H04W 4/70 | (2018.01) |
| H04L 5/14 | (2006.01) |
| H04W 36/00 | (2009.01) |
| H04W 24/08 | (2009.01) |
| H04W 72/04 | (2009.01) |
| H04W 74/08 | (2009.01) |
| H04L 29/06 | (2006.01) |
| H04W 24/02 | (2009.01) |
| H04W 16/28 | (2009.01) |
| H04J 11/00 | (2006.01) |
| H04W 24/10 | (2009.01) |
| H04W 36/30 | (2009.01) |
| H01Q 1/24 | (2006.01) |
| H01Q 3/00 | (2006.01) |
| H04W 28/12 | (2009.01) |
| H04B 7/06 | (2006.01) |
| H04W 84/12 | (2009.01) |
| H04W 88/06 | (2009.01) |
| H04W 88/08 | (2009.01) |
| H04L 5/00 | (2006.01) |
| H04W 84/18 | (2009.01) |

(52) U.S. Cl.
CPC ......... *H04B 7/0632* (2013.01); *H04B 7/0695* (2013.01); *H04J 11/0023* (2013.01); *H04L 5/14* (2013.01); *H04L 69/16* (2013.01); *H04W 4/005* (2013.01); *H04W 4/70* (2018.02); *H04W 16/28* (2013.01); *H04W 24/02* (2013.01); *H04W 24/08* (2013.01); *H04W 24/10* (2013.01); *H04W 28/12* (2013.01); *H04W 36/0066* (2013.01); *H04W 36/0083* (2013.01); *H04W 36/30* (2013.01); *H04W 52/0209* (2013.01); *H04W 72/042* (2013.01); *H04W 72/0413* (2013.01); *H04W 74/0833* (2013.01); *H04L 5/0007* (2013.01); *H04W 84/12* (2013.01); *H04W 84/18* (2013.01); *H04W 88/06* (2013.01); *H04W 88/08* (2013.01); *Y02B 60/50* (2013.01); *Y02D 70/00* (2018.01)

(58) Field of Classification Search
USPC .................................................. 370/329–332
See application file for complete search history.

(56) References Cited

U.S. PATENT DOCUMENTS

| | | | |
|---|---|---|---|
| 7,496,066 | B2 | 2/2009 | Speltacker et al. |
| 8,379,528 | B1* | 2/2013 | Xue .................... H04L 43/0817 |
| | | | 370/241 |
| 2002/0154627 | A1 | 10/2002 | Abrol et al. |
| 2005/0070288 | A1 | 3/2005 | Belkin et al. |
| 2007/0263613 | A1* | 11/2007 | Hara ..................... H04L 12/66 |
| | | | 370/356 |
| 2009/0097450 | A1* | 4/2009 | Wallis ............... H04W 36/0022 |
| | | | 370/331 |
| 2009/0176489 | A1* | 7/2009 | Ulupinar .......... H04W 36/0016 |
| | | | 455/432.2 |
| 2010/0128696 | A1 | 5/2010 | Fantini et al. |
| 2010/0135266 | A1* | 6/2010 | Karaoguz ........... H04W 84/045 |
| | | | 370/338 |
| 2010/0303008 | A1 | 12/2010 | Wietfeldt et al. |
| 2012/0224516 | A1* | 9/2012 | Stojanovski ...... H04L 29/12066 |
| | | | 370/310 |

FOREIGN PATENT DOCUMENTS

| | | |
|---|---|---|
| JP | 2009524275 | 6/2009 |
| JP | 2010518759 | 5/2010 |
| JP | 2010288223 | 12/2010 |
| KR | 1020100123908 | 11/2010 |
| KR | 1020110082048 | 7/2011 |
| WO | 0033189 | 6/2000 |

OTHER PUBLICATIONS

International Search Report for PCT/US2014/048110, dated Nov. 7, 2014, 3 pages.
"IP Mobility Support for IPv4, Revised", Internet Engineering Task Force (IETF), Request for Comments (RFC): 5944, Nov. 2010 (Mobile IPv4), 100 pages.
"Mobility Support in IPv6", Internet Engineering Task Force (IETF), Request for Comments: 6275, Jul. 2011 (Mobile IPv6)), 169 pages.
ETSI TS 136 300 V11.3.0 (Nov. 2012): LTE; Evolved Universal Terrestrial Radio Access (E-UTRA) and Evolved Universal Terrestrial Radio Access Network (E-Utran); Overall description; Stage 2 (3GPP TS 36.300 version 11.3.0 Release 11), Nov. 2012; 217 pages.
3GPP TS 23.401 V12.1.0 (Jun. 2013) "3rd Generation Partnership Project; Technical Specification Group Services and System Aspects; General Packet Radio Service (GPRS) enhancements for Evolved Universal Terrestrial Radio Access Network (E-UTRAN) access (Release 12)", Jun. 2013, 291 pages.
Office Action for Korean Patent Application No. 10-2015-7034544 dated Dec. 27, 2016, 8 pages.
European Search Report for European Patent Application No. 14829110.7 dated Mar. 14, 2017, 8 pages.
Universal Mobile Telecommunications System (UMTS); LTE; IP Multimedia (IM) Core Network (CN) Subsystem IP Multimedia Subsystem (IMS) Service continuity; Stage 3 (3GPP TS 24.237 Version 8.13.0 Release 8) Technical Specification, European Telecommunications Standards Institute (ETSI) Jul. 1, 2013, 77 pages.
Office Action for Japanese Patent Application No. 2016-521924, dated Feb. 14, 2017, 6 pages (Including 3 pages of English translation).
Office Action for Chinese Patent Application No. 201480035517.2, dated Apr. 3, 2018, 5 pages.

* cited by examiner

APPARATUS, SYSTEM AND METHOD OF SELECTIVELY PROVIDING INTERNET PROTOCOL (IP) SESSION CONTINUITY

CROSS REFERENCE

This application claims the benefit of and priority from U.S. Provisional Patent Application No. 61/859,121 entitled "Advanced Wireless Communication Systems and Techniques", filed Jul. 26, 2013, the entire disclosure of which is incorporated herein by reference.

TECHNICAL FIELD

Some embodiments described herein generally relate to selectively providing Internet Protocol (IP) session continuity.

BACKGROUND

Various types of mobile networks are configured to provide Internet Protocol (IP) session continuity for mobile devices to guarantee session continuity of each IP session, for example, when a mobile device moves from one network to another, e.g., as a result of a radio link handoff. For example, a source IP address of the mobile device may change, when the mobile devices moves between networks, for example, as a result of a change in a network prefix portion of the source IP address. As a result of the change in the source IP address of the mobile device, packets, which carry the old IP address, e.g., packets generated by network nodes, which are unaware of the change in the source IP address, will not reach the mobile device.

Common solutions for guarantying the IP session continuity include, for example, the Mobile Internet Protocol (MIP) and Proxy MIP (PMIP) schemes defined by the Internet Engineering Task Force (IETF), and the General Packet Radio Service (GPRS) Tunneling Protocol (GTP) defined by the 3rd Generation Partnership Project (3GPP).

These solutions rely on a network agent, which allocates to the mobile device a source IP address, which remains unchanged throughout a session. The network agent keeps track of the location of the mobile device, and creates for the mobile device a temporary care-of address, which changes whenever the mobile device moves from one network to another. The network agent forwards packets to and from the mobile device by creating special tunnels that override standard routing schemes.

However, these solutions for guarantying the IP session continuity consume network resources, as they require a signaling scheme to keep track of the location of the mobile device, and performing encapsulation/decapsulation of packets through a tunneling process, which in turn requires processing power and generates overhead information to be transmitted for each packet. Additionally, the tunneling process induces delays in the communication of the packets and, as a result, a Quality of Experience (QoE) of real-time applications, e.g., interactive video conferencing and/or video sharing, may be degraded.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
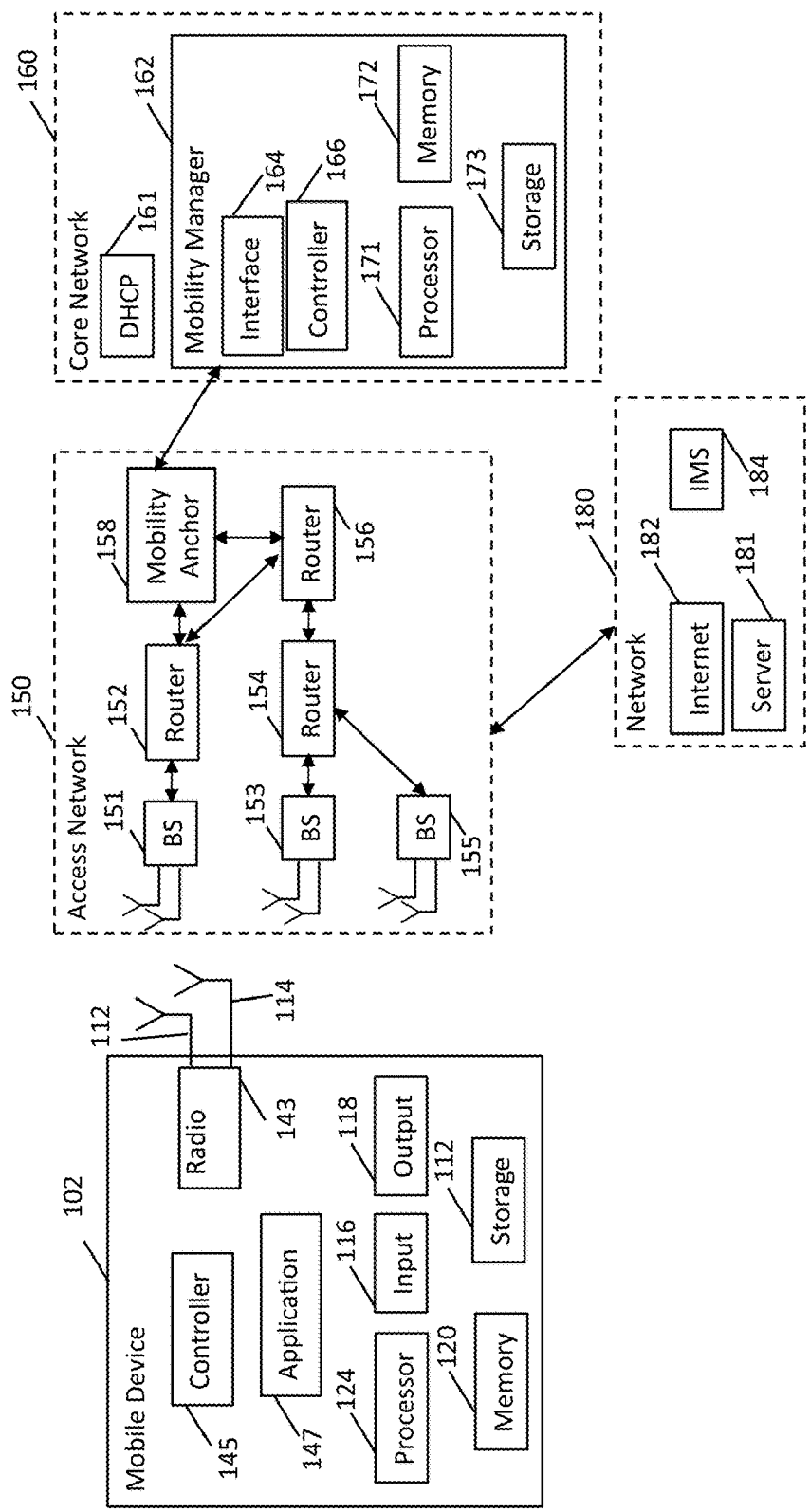
FIG. 1 is a schematic block diagram illustration of a wireless communication system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a mobile device, a mobile node, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Internet Engineering Task Force (IETF) Specifications (including "*IP Mobility Support for IPv4, Revised*", *Internet Engineering Task Force (IETF), Request for Comments (RFC)*: 5944", November 2010 (Mobile IPv4); and/or "*Mobility Support in IPv6*", *IETF, RFC* 6275", July 2011 (Mobile IPv6)) and/or future versions and/or derivatives thereof; existing cellular specifications and/or protocols, e.g., 3rd Generation Partnership Project (3GPP), and/or 3GPP Long Term Evolution (LTE) Specifications (including *ETSI TS* 136 300 *V*11.3.0 (2012-11): *LTE; Evolved Universal Terrestrial Radio Access (E-UTRA) and Evolved Universal Terrestrial Radio Access Network (E-UTRAN); Overall description; Stage 2 (3GPP TS* 36.300 *version* 11.3.0 *Release* 11), 2012; TS 23.401 ("*3rd Generation Partnership Project; Technical Specification Group Services and System Aspects; General Packet Radio Service (GPRS) enhancements for Evolved Universal Terrestrial Radio Access Network (E-UTRAN) access (Release* 12)", V12.1.0, June 2013)), and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control (MAC) and Physical Layer (PHY) Specifications,* Mar. 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a radio, which is capable of communicating a wireless communication signal, may include a wireless transmitter to transmit the wireless communication signal to at least one other radio, and/or a wireless communication receiver to receive the wireless communication signal from at least one other radio. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a cellular system. However, other embodiments may be implemented in any other suitable wireless communication network or system, e.g., an IP-based communication network, and the like.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a wireless communication system 100, in accordance with some demonstrative embodiments.

As shown in FIG. 1, in some demonstrative embodiments, system 100 may include at least one mobile device (also referred to as "mobile node") 102 capable of communicating with one or more wired networks 180 via at least one radio access network (RAN) 150, e.g., as described below.

In some demonstrative embodiments, mobile device 102 may communicate with a server 181 of a network 180.

In some demonstrative embodiments, networks 180 may include one or more Packet Data Networks (PDNs). For example, networks 180 may include an Internet network 182, an IP Multimedia Core Network Subsystem (IMS) network 184, and/or any other PDN. In other embodiments, networks 180 may include any other suitable additional and/or alternative network.

In some demonstrative embodiments, mobile device 102 may communicate with one or more Base Stations (BSs) (also referred to as "network nodes" or "nodes"), e.g., a BS 151, a BS 153 and/or a BS 155, of access network 150, via one or more wireless communication mediums, for example, a radio channel, a cellular channel, an RF channel, a Wireless Fidelity (WiFi) channel, an IR channel, and the like.

In some demonstrative embodiments, access network 150 may also include a plurality of routers to route traffic between the BSs of access network 150 and networks 180. For example, access network 150 may include a router 152 to route communications between BS 151 and a router 156; and a router 154 to route communications between BSs 153 and 155 and router 156. In one example, router 156 may be directly connected to a network of networks 180. In another example, router 156 may be indirectly connected to network 180 via one or more other routers.

In some demonstrative embodiments, routers 152, 154 and/or 156 may include or may be implemented as part of one or more Gateways (GWs), for example, a PDN Gateway (PGW), a Local Gateway (LGW), a Serving Gateway (SGW), and/or any other GW, e.g., as described below.

In some demonstrative embodiments, system 100 may also include a Core Network (CN or CNW) 160, which may be configured to provide one or more services to mobile device 102, and/or to setup and/or manage communication between mobile device 102 and RAN 150 and/or networks 180.

In some demonstrative embodiments, CN 160 may include a mobility manager 162 to manage one or more mobility-related aspects of a mobility of mobile device 102 between RAT networks, e.g., as described below.

In some demonstrative embodiments, mobility manager 162 may include an interface 164 to interface between mobility manager 162 and one or more other elements of system 100, e.g., as described below.

In some demonstrative embodiments, interface 164 may include a management interface to communicate management messages to manage a session of mobile device 102, e.g., as described below.

In some demonstrative embodiments, interface 164 may be configured to receive a request to setup a communication session for mobile device 102.

In some demonstrative embodiments, mobility manager 162 may also include a controller 166 to configure a session connection for the communication session, e.g., as described below.

In some demonstrative embodiments, mobility manager 162 may also include, for example, one or more of a processor 171, a memory unit 172, and a storage unit 173. Mobility manager 162 may optionally include other suitable hardware components and/or software components. In some demonstrative embodiments, some or all of the components of one or more of mobility manager 162 may be enclosed in a common housing or packaging, and may be interconnected or operably associated using one or more wired or wireless links.

Processor 171 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 171 executes instructions, for example, of an Operating System (OS) of mobility manager 162 and/or of one or more suitable applications.

Memory unit 172 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 173 includes, for example, a hard disk drive, a floppy disk drive, a Compact Disk (CD) drive, a CD-ROM drive, a DVD drive, or other suitable removable or non-removable storage units. Memory unit 172 and/or storage unit 173, for example, may store data processed by mobility manager 162.

In some demonstrative embodiments, access network 150 may include at least one mobility anchor 158 configured to setup a routing override for an Internet Protocol (IP) session of mobile device 102.

The phrase "routing override" as used herein may include any protocol and/or mechanism configured to maintain session continuity of the IP session, e.g., even if mobile device moves between networks. For example, a routing override protocol may be configured to maintain a constant IP address for an IP session, e.g., even when moving between gateways and/or networks.

In some demonstrative embodiments, mobility anchor 158 may setup the routing override according to a tunneling protocol, for example, the Mobile Internet Protocol (MIP) and Proxy MIP (PMIP) schemes defined by the Internet Engineering Task Force (IETF), and/or the General Packet Radio Service (GPRS) Tunneling Protocol (GTP) defined by the 3rd Generation Partnership Project (3GPP).

In other embodiments, the mobility anchor 158 may setup the routing override according to any other protocol or mechanism, for example, a host routing protocol, a Double Reverse Network address translation (NAT) (DrNAT), or any other protocol.

In some demonstrative embodiments, mobility manager 162 may initiate and/or manage the setup of the routing override for the IP session of mobile device 102. For example, controller 166 may send to mobility anchor 158 a request to setup the routing override for the IP session of mobile device 102, e.g., as described below.

In some demonstrative embodiments, system 100 may include a cellular network. For example, system 100 may include a Global System for Mobile (GSM) network, a Universal Mobile Telecommunications System (UMTS) network, a Long Term Evolution (LTE) network, an LTE-advanced network, a Fifth Generation (5G) network, or any other cellular network.

In one example, mobile device 102 may include a User Entity (UE), BSs 151, 153 and/or 155 may include a cellular node, for example, an evolved Node B (eNB); mobility manager 162 may include a Mobility Management Entity (MME); routers 152, 154 and/or 156 may include one or more gateways, e.g., a SGW, a LGW, and the like; and/or mobility anchor 158 may include, for example, a PGW, e.g., as described below with reference to FIGS. 3A and 3B.

In other embodiments, system 100 may include any other network, e.g., a non-cellular network.

In some demonstrative embodiments, mobile device 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, mobile device 102 may include one or more wireless communication units to perform wireless communication between mobile device 102 and access network 150, and/or with one or more other wireless communication devices. For example, mobile device 102 may include at least one radio 143 including one or more wireless transmitters, receivers and/or transceivers able to send and/or receive wireless communication signals, RF signals, frames, blocks, transmission streams, packets, messages, data items, and/or data.

In some demonstrative embodiments, radio 143 may include a multiple input multiple output (MIMO) transmitters receivers system (not shown), which may be capable of performing antenna beamforming methods, if desired. In other embodiments, radio 143 may include any other transmitters and/or receivers.

In some demonstrative embodiments, radio 143 may include a turbo decoder and/or a turbo encoder (not shown) for encoding and/or decoding data bits into data symbols, if desired. In other embodiments, radio 143 may include any other encoder and/or decode.

In some demonstrative embodiments, mobile device 102 may communicate with access network 150 via at least one cellular link. For example, radio 143 may include OFDM and/or SC-FDMA modulators and/or demodulators (not shown) configured to communicate OFDM signals over downlink channels, e.g., between access network 150 and mobile device 102, and SC-FDMA signals over uplink channels, e.g., between mobile device 102 and access network 150. In other embodiments, radio 143 may include any other modulators and/or demodulators.

In some demonstrative embodiments, radio 143 may be implemented in the form of a System on Chip (SoC) including circuitry and/or logic configured to perform the functionality of radio 143, e.g., as described below.

In some demonstrative embodiments, radio 143 may be associated with, one or more antennas. In one example, radio 143 may be associated with at least two antennas, e.g., antennas 112 and 114, or any other number of antennas, e.g., one antenna or more than two antennas.

In some demonstrative embodiments, antennas 112 and/or 114 may include any type of antennas suitable for transmitting and/or receiving wireless communication signals, blocks, frames, transmission streams, packets, messages and/or data. For example, antennas 112, and/or 114 may include any suitable configuration, structure and/or arrangement of one or more antenna elements, components, units, assemblies and/or arrays. For example, antennas 112 and/or 114 may include a phased array antenna, a dipole antenna, a single element antenna, a set of switched beam antennas, and/or the like.

In some embodiments, antennas 112 and/or 114 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, mobile device 102 may also include a controller 145 to control communications performed by mobile device 102, e.g., as described below.

In one demonstrative embodiment, one or more functionalities of controller 145 may be implemented as part of an Operating System (OS) of mobile device 102.

In another demonstrative embodiment, one or more functionalities of controller 147 may be implemented as part of an application 147 executed by mobile device 102.

In another demonstrative embodiment, one or more functionalities of controller 145 may be implemented as part of the wireless communication unit of mobile device 102. In one example, controller 145 and radio 143 may be implemented as part of a wireless communication SoC.

In other embodiments, one or more functionalities of controller 145 may be implemented as part of any other element of mobile device 102.

In some demonstrative embodiments, mobile device 102 may also include, for example, one or more of a processor 124, an input unit 116, an output unit 118, a memory unit 120, and a storage unit 122. Mobile device 102 may optionally include other suitable hardware components and/or software components. In some demonstrative embodiments, some or all of the components of one or more of mobile device 102 may be enclosed in a common housing or packaging, and may be interconnected or operably associated using one or more wired or wireless links.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of mobile device 102 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by mobile device 102.

In some demonstrative embodiments, guarantying the IP session continuity for a communication session of mobile device 102 may consume network resources, which may be required, for example, to support a signaling scheme to keep track of the location of mobile device 102. Additionally, the routing override at mobility anchor 158 may introduce overhead information to be transmitted with each packet communicated during the communication session. Additionally, the routing override at mobility anchor 158 may induce delays in the communication of the packets and, as a result, a Quality of Experience (QoE) of real-time applications, e.g., interactive video conferencing and/or video sharing, may be degraded.

Accordingly, guarantying the IP session continuity for each communication session, e.g., by default, may result in an increased consumption of network resources.

In some demonstrative embodiments, one or more elements of system 100 may be configured to enable selectively providing IP session continuity to communication sessions of one or more mobile devices, e.g., including mobile device 102, e.g., on a per-session basis. For example, one or more elements of system 100 may be configured to enable selecting between guarantying IP session continuity to one or more communication sessions, and not-guarantying IP session continuity to one or more other communication sessions, e.g., as described below.

In some demonstrative embodiments, one or more elements of system 100 may be configured to setup and/or use a session connection, which does not guarantee IP session continuity ("the non-guaranteed session connection").

For example, the non-guaranteed session connection may be set up and/or used for communicating traffic of a communication session, which does not require IP session continuity to operate properly, or which may not be significantly affected if IP session continuity is not maintained. In one example, the non-guaranteed session connection may be set up and/or used for communicating traffic of applications characterized by short bursts of packet exchange. For example, a QoE of some applications, e.g., an electronic mail (email) application or a web-browsing application, may not be substantially affected by disruptions in IP session continuity. Accordingly, a non-guaranteed session connection may be setup for such applications.

In some demonstrative embodiments, one or more elements of system 100 may be configured to setup and/or use a session connection, which guarantees IP session continuity ("the guaranteed session connection").

For example, the guaranteed session connection may be set up and/or used for communicating traffic of an application, which requires IP session continuity to operate properly, or which may be significantly affected if IP session continuity is not maintained. In one example, the guaranteed session connection may be set up and/or used for communicating traffic of applications characterized by long sequences of packet exchange, and/or applications requiring short delays. For example, a QoE of some applications, e.g., a video conferencing application, a video streaming application, a gaming application, or the like, may be substantially affected by disruptions in IP session continuity. Accordingly, a guaranteed session connection may be setup for such applications.

In some demonstrative embodiments, one or more elements of system 100 may be configured to identify cases, e.g., on a per-application basis or a per-session basis, when IP session continuity is required, and to selectively provide the IP session continuity, for example, only for the cases which require the IP session continuity, e.g., while not providing IP session continuity to cases which do not require IP session continuity.

In some demonstrative embodiments, one or more elements of system 100 may be configured to detect and/or determine whether or not IP session continuity is to be set up and/or guaranteed with respect to a service or an IP session, e.g., as described below.

In some demonstrative embodiments, a client side of an IP session, for example, mobile device 102, may be configured to determine whether IP session continuity is to be guaranteed for the IP session. For example, application 147 and/or controller 145 may be configured to determine whether an IP session, which is to be initiated between mobile device 102 and server 180, is to be classified as an IP session requiring IP session continuity or as an IP session not requiring IP session continuity, e.g., based on the type of application 147, a type of traffic to be communicated during the IP session, and/or any other information corresponding to the IP session.

In some demonstrative embodiments, a server side of an IP session, for example, server 180, may be configured to determine whether IP session continuity is to be guaranteed for the IP session. For example, server 180 may be configured to determine whether an IP session, which is to be initiated between mobile device 102 and server 180, is to be classified as an IP session requiring IP session continuity or as an IP session not-requiring IP session continuity, e.g., based on the type of application 147, a type of traffic to be communicated during the IP session, and/or any other information corresponding to the IP session.

In some demonstrative embodiments, a network entity of core network 160 may be configured to determine whether IP session continuity is to be guaranteed for the IP session, e.g., as described below.

In some demonstrative embodiments, mobility manager 162 may be configured to identify whether or not a new IP session to be set up between a mobile device a server, e.g., between mobile device 102 and server 180, requires IP session continuity.

In some demonstrative embodiments, mobility manager 162 may determine whether or not the new IP session requires IP session continuity, based on one or more attributes of a client side of the IP session, e.g., one or more attributes of mobile device 102. For example, controller 166 may be configured to identify traffic from predefined types of mobile devices.

In some demonstrative embodiments, an infrastructure of system 100 may be configured to keep track of a plurality of well-known gadgets, which may have predefined traffic needs. For example, a gadget, e.g., mobile device 102, may be configured to communicate traffic of a predefined type, which may either require or not require IP session continuity.

In some demonstrative embodiments, whenever a gadget connects to system 100, an identity of the gadget may be detected, e.g., based on identifying characteristics, which may be provided by the gadget. In one example, a server, e.g., an Authentication, Authorization and Accounting (AAA) server may be configured to authorize service for the gadget, and may maintain a database of well-known gadgets. The AAA server may provide to mobility manager 162 and/or mobility anchor 158 information regarding the type of the gadget, and mobility manager 162 and/or mobility anchor 158 may be able to determine whether or not to guarantee IP session continuity for IP sessions belonging to the gadget, e.g., based on the type of the gadget.

In some demonstrative embodiments, mobility manager 162 and/or mobility anchor 158 may determine whether or not the new IP session requires IP session continuity, based on one or more attributes of a server side of the IP session, e.g., one or more attributes of server 180. For example, mobility manager 162 and/or mobility anchor 158 may be configured to identify traffic to well-known ports, e.g., transmission Control Protocol (TCP) or User Datagram Protocol (UDP) ports, implying session type.

In some demonstrative embodiments, determining whether or not the new IP session requires IP session continuity, based on one or more attributes of a server side of the IP session, may not require mobility manager 162 and/or mobility anchor 158 to maintain and/or monitor preliminary information about mobile device 102. Additionally, determining whether or not the new IP session requires IP session continuity, based on one or more attributes of a server side of the IP session, may enable handling mobile devices, which generate both traffic that requires IP session continuity, as well as traffic that does not require IP session continuity.

In some demonstrative embodiments, mobility manager 162 and/or mobility anchor 158 may identify a destination port, e.g., a TCP or UDP port, of server 180 to handle a new IP session to be set up, e.g., based on an IP header of a first packet of the IP session. Mobility manager 162 and/or mobility anchor 158 may identify whether or not the IP session requires IP session continuity or not, e.g., based on the destination TCP or UDP port.

In some demonstrative embodiments, mobility manager 162 and/or mobility anchor 158 may determine whether or not the new IP session requires IP session continuity, based on analyzing a setup of the IP session, e.g., through deep packet inspection methods.

In some demonstrative embodiments, mobility manager 162 and/or mobility anchor 158 may perform deep packet inspection to inspect a control flow of a new IP session. In one example, multimedia conferencing traffic may be detected by analyzing Session Initiation Protocol (SIP) traffic, and identifying the type of service required, and Real Time Transport Protocol (RTP) and/or RTP Control Protocol (RTCP) characteristics of the IP session.

In some demonstrative embodiments, determining whether or not the new IP session requires IP session continuity, based on analyzing the setup of the IP session, may enable an improved level of differentiation between IP sessions requiring IP session continuity and IP sessions not requiring IP session continuity, e.g., on a per-session basis. However, analyzing the setup of the IP session may require a relatively sophisticated level of deep packet inspection, e.g., without delaying traffic; and/or may require maintaining a session database with session characteristics and types of required services.

In some demonstrative embodiments, mobility manager 162 and/or mobility anchor 158 may receive information indicating whether or not IP session continuity is to be maintained for the IP session, for example, if the server side or the client side are configured to identify whether or not IP session continuity is to be required, e.g., as described below.

In some demonstrative embodiments, mobile device 102 may be configured to provide to mobility manager 162 information indicating whether or not IP session continuity is to be maintained for an IP session to be setup for mobile device 102, e.g., if the need for IP session continuity is being detected by the client side.

In some demonstrative embodiments, a socket interface routine of application 147 may be configured to include a type of service application 147 requires for the IP session, e.g., to indicate whether IP session continuity is required or not required. A socket layer of application 147 may create a pseudo request to a server of system 100, e.g., a Dynamic Host Configuration Protocol (DHCP) server 161, a Domain Name System (DNS) server (not shown), or any other server. The pseudo request may include an indication of the IP session continuity requirements of the IP session. Mobility manager 162 may be configured to intercept the pseudo request, and may determine whether or not IP session continuity is to be maintained for the IP session, e.g., based on the intercepted pseudo request.

In some demonstrative embodiments, server 180 may be configured to provide to mobility manager 162 information indicating whether or not IP session continuity is to be maintained for an IP session to be setup for mobile device 102, e.g., if the need for IP session continuity is being detected by the server side.

In one example, server 180 may create a pseudo packet including an indication of the IP session continuity requirements of the IP session ("continuity information"). Server 180 may send the pseudo packet to the client side, e.g., to mobile device 102. Mobility manager 162 may be configured to intercept the pseudo packet, and may determine whether or not IP session continuity is to be maintained for the IP session, e.g., based on the intercepted pseudo request.

In another example, server 180 may send the continuity information to a DNS infrastructure (not shown), and mobility manager 162 may obtain the continuity information via monitoring DNS traffic. This technique may enable server 180 to upload the continuity information to the DNS infrastructure only once.

In some demonstrative embodiments, mobility manager 162 may be configured to manage setting up a new IP session for mobile device 102 by selectively setting up the IP session to guarantee or not to guarantee IP session continuity, for example, in a manner, which may be transparent to mobile device 102 and/or to server 180, e.g., as described below.

In some demonstrative embodiments, interface 164 may receive a request to setup a communication session for mobile device 102, e.g., as described above.

In some demonstrative embodiments, mobility manager 162 may keep track of whether or not mobile device 102 is hosting traffic activity that requires IP session continuity or not, e.g., according to a service type of IP sessions of mobile device 102.

In some demonstrative embodiments, controller 166 may be configured to select to configure a session connection for the communication session to guarantee IP session continuity, when IP session continuity is to be maintained for the communication session; and to select to configure the session connection without IP session continuity guarantee, when IP session continuity is not to be maintained for the communication session.

In some demonstrative embodiments, controller 166 may determine whether or not IP session continuity is to be maintained for the communication session.

In some demonstrative embodiments, controller 166 may determine whether or not IP session continuity is to be maintained for the communication session, based on a type of traffic to be communicated during the communication session, e.g., as described above.

In some demonstrative embodiments, controller 166 may determine whether or not IP session continuity is to be maintained for the communication session, based on a type of mobile device 102, e.g., as described above.

In some demonstrative embodiments, controller 166 may determine whether or not IP session continuity is to be maintained for the communication session, based on contents of a packet of the communication session, e.g., as described above.

In some demonstrative embodiments, controller 166 may determine whether or not IP session continuity is to be maintained for the communication session, based on an IP header of the packet, e.g., as described above.

In some demonstrative embodiments, the determination whether or not IP session continuity is to be maintained for the communication session may be made at another element of system 100. According to these embodiments, interface 164 may receive a message indicating whether or not IP session continuity is to be maintained for the communication session.

In some demonstrative embodiments, the message may be sent from mobile device 102, for example, if controller 145 and/or application 147 are configured to determine whether or not IP session continuity is to be maintained for the communication session, e.g., as described above.

In some demonstrative embodiments, the message may be sent from a server, e.g., sever 180, which is to communicate with mobile device 102 during the communication session, for example, if server 180 is configured to determine whether or not IP session continuity is to be maintained for the communication session, e.g., as described above.

In some demonstrative embodiments, controller 166 may request mobility anchor 158 to setup a routing override for the session connection, e.g., only if controller 166 selects to configure the session connection to guarantee IP session continuity.

In one example, mobility manager 162 may request mobility anchor 158 to create a routing override for the IP session, for example, if the IP session requires IP session continuity and mobile device 102 is performing a handoff that requires routing support. Mobility manger 162 may select not to request mobility anchor to create the routing override, for example, if there are no active sessions that require IP session continuity during the handoff. Accordingly, a new IP address will be assigned to mobile node device 102 as a result of the handoff.

In some demonstrative embodiments, having mobility manager 162 make the selection between guarantying or not guarantying IP session continuity for the IP session of mobile device 102 may be advantageous, e.g., by making the selection transparent to mobile device 102, a networking stack of mobile device 102, applications hosted by mobile device 102, and/or server 180.

In some demonstrative embodiments, mobility manager 162 may be configured to keep track of each session initiation and ending per each mobile device, and the selection of providing or not providing IP session continuity to each IP session.

In some demonstrative embodiments, mobility manager 162 may be configured to manage setting up an IP session for mobile device 102 by setting up for the IP session both a first session connection configured to guarantee IP session continuity, as well as a second session configured not to guarantee IP session continuity, e.g., as described below. According to these embodiments, mobile device 102, may select which session connection to use, e.g., based on whether or not IP session continuity is to be maintained for the IP session.

In some demonstrative embodiments, mobility manager 162 may configure the first session connection corresponding to a first IP address, and the second session connection corresponding to a second IP address.

In some demonstrative embodiments, the first IP address may be configured to exist, e.g., even after handoff events, and the second IP may not be guaranteed between handoff events.

In some demonstrative embodiments, radio 143 may transmit, e.g., to a BS of radio access network 150, a session setup request to setup a communication session, e.g., responsive to a request from application 147 to setup a communication session with server 180.

In some demonstrative embodiments, the session setup request may include, for example, a PDN connection request, e.g., as described below.

In some demonstrative embodiments, interface 164 may receive, e.g., via access network 150, a request to setup the communication session for mobile device 102.

In some demonstrative embodiments, controller 166 may configure a first session connection to maintain (guarantee)

IP session continuity, and a second session not configured to maintain (guarantee) IP session continuity. The first session connection may be assigned with a first IP address, and the second session connection may be assigned with a second IP address, different from the first IP address.

In some demonstrative embodiments, the first and second IP addresses may include addresses provided by DHCP server 161, or any other entity of core network 160.

In some demonstrative embodiments, controller 166 may request DHCP 161 to set up the first and second IP addresses.

In some demonstrative embodiments, mobility manager 162 may send to DHCP server 161 a request to setup the first and second IP addresses. The request may include an indication that the first IP address is to be used to guarantee IP session continuity, while the second IP address is not to guarantee IP session continuity.

In some demonstrative embodiments, DHCP server 161 may receive the request from mobility manager 162, and DHCP server 161 may generate the first and second IP addresses. DHCP server 161 may send, e.g., to mobility manager 162 and/or to one or more elements of system 100, at least one address-assignment message including the first and second IP addresses.

In some demonstrative embodiments, DHCP server 161 may be configured to indicate with respect to an IP address provided by DHCP server 161, whether the IP address is configured to guarantee IP session continuity, or not configured to guarantee IP session continuity.

In some demonstrative embodiments, controller 166 may request mobility anchor 158 to setup a routing override for the first session connection, for example, while controller 166 may select not to request mobility anchor 158 to setup a routing override for the second session connection.

In some demonstrative embodiments, the first and second addresses may correspond to first and second respective PDN connections, which may both correspond to the same service type, or the same session, e.g., as described below.

In some demonstrative embodiments, the first PDN connection may be terminated at a first GW, e.g., a PGW, and the second PDN connection may be terminated at a second GW, e.g., a LGW, as described below.

In some demonstrative embodiments, radio 143 may receive, e.g., via the BS of access network 150, a session setup response, e.g., in response to the session setup request. The session setup response may include the first and second IP addresses assigned to the first and second session connections.

In some demonstrative embodiments, the session setup response may include, for example, a PDN connection response.

In some demonstrative embodiments, controller 145 may be configured to select to use the first IP address for the communication session, e.g., if IP session continuity is to be maintained for the communication session, and to select to use the second IP address for the communication session, e.g., if IP session continuity is not to be maintained for the communication session, e.g., as described above.

In some demonstrative embodiments, controller 145 may be configured to select between the first and second IP addresses, for example, based on one or more attributes of traffic to be communicated during the communication session, e.g., as described above.

In some demonstrative embodiments, controller 145 may receive from application 147 an indication to indicate whether or not IP session continuity is to be guaranteed for the communication session. According to these embodiments, controller 145 may select between the first and second IP addresses, for example, based on the indication from application 147.

In one example, application 147 may select between opening for the communication session a socket with IP session continuity to use the first IP address, or a socket that does not guarantee IP session continuity to use the second IP address.

In some demonstrative embodiments, controller 145 may be configured to select between the first and second IP addresses, for example, based on a type of an application to use the communication session, e.g., a type of application 147.

In some demonstrative embodiments, enabling mobile device 102 to select between the first and second IP addresses may enable, for example, selectively guarantying IP session continuity on a per-application basis, or even on a per-session basis, e.g., if application 147 is configured to open a plurality of sockets with different IP session continuity requirements.

Figure 2A:
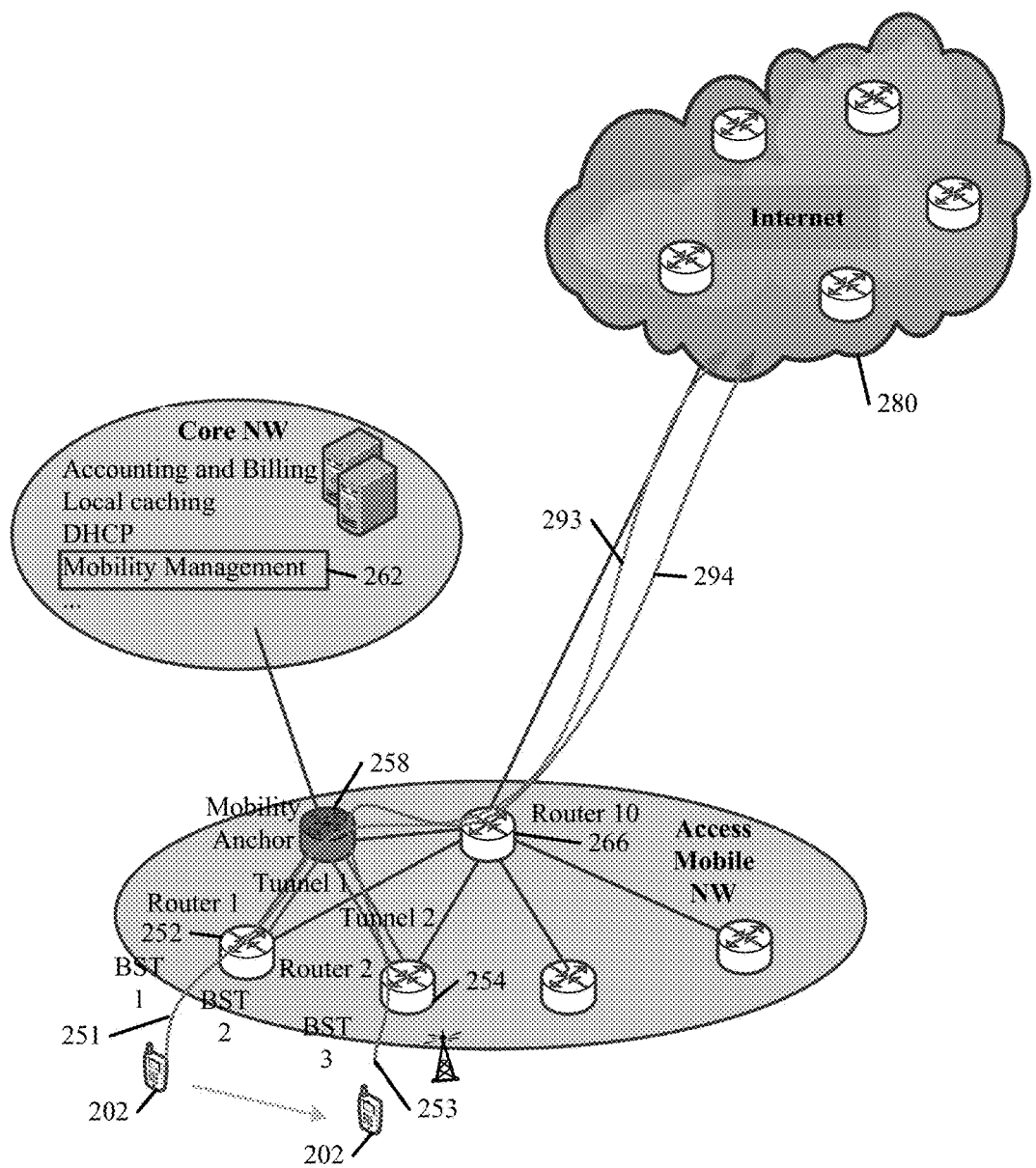
FIG. 2A is a schematic illustration of communication paths of a first connection, using Internet Protocol (IP) session continuity, between a mobile device and a network.
Figure 2B:
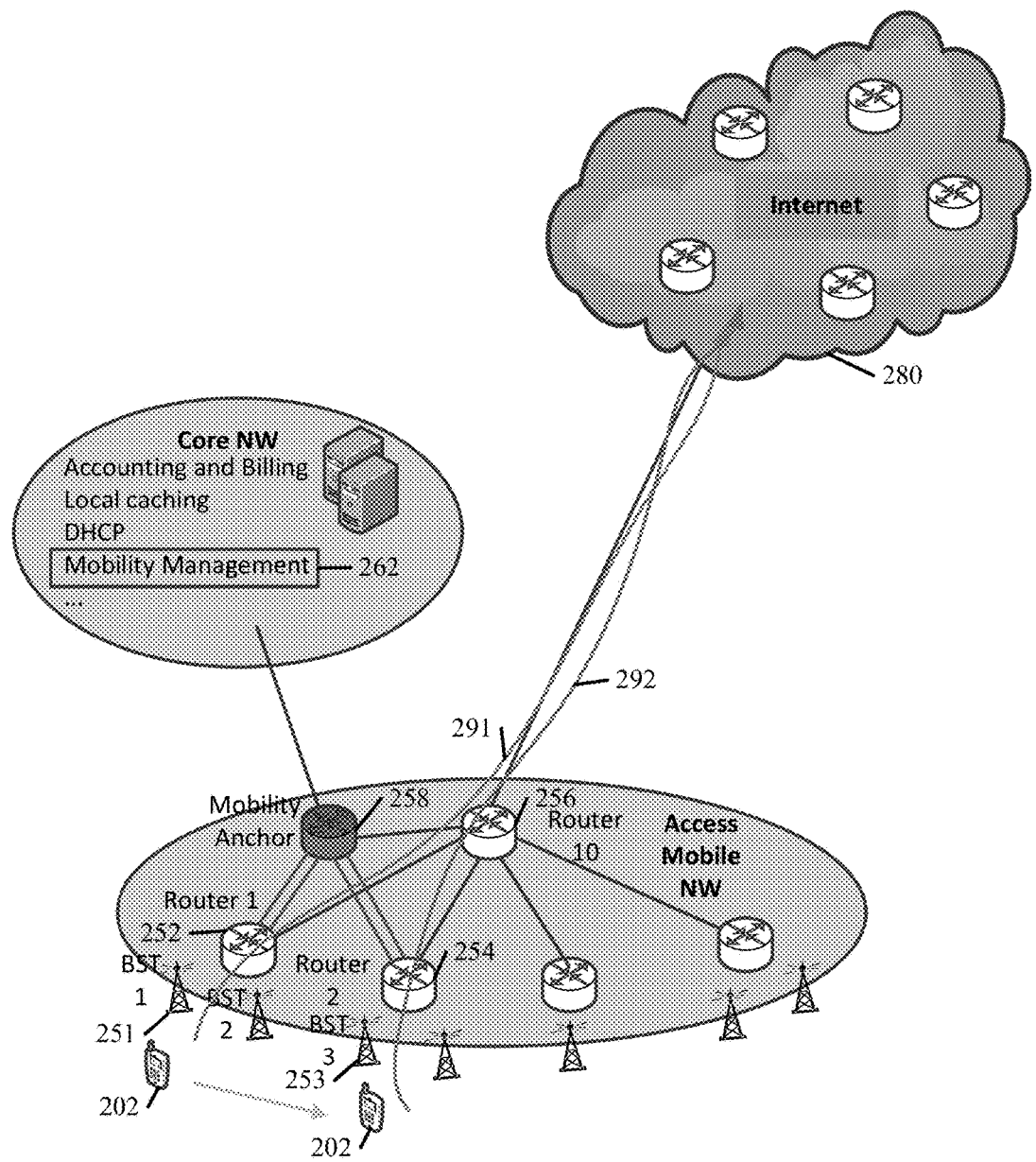
FIG. 2B is a schematic illustration of communication paths of a second connection between the mobile device and the network without IP session continuity, in accordance with some demonstrative embodiments.

Reference is made to FIG. 2A, which schematically illustrates communication paths of a connection, using IP session continuity, between a mobile device 202 and a network 280; and to FIG. 2B, which schematically illustrates communication paths of a connection between mobile device 202 and the network 280 without IP session continuity, in accordance with some demonstrative embodiments.

In some demonstrative embodiments, a session connection guarantying IP session continuity may enable UE 202 to maintain continuity via the session connection, e.g., even when mobile device 202 is handed over between networks. For example, as shown in FIG. 2A, a mobility anchor 258 may be configured, e.g., by a mobility manager 262, to perform routing override for the session connection, such that the session connection may use a first communication path 293 via mobility anchor 258, e.g., when mobile device is communicating with a first BS 251 associated with a first router 252. The session connection may use a second communication path 294 via mobility anchor 258, e.g., when mobile device is handed off to a second BS 352, which is associated with a second router 254.

According to these embodiments, mobility anchor 258 may use the routing override to maintain continuity of the session connection, e.g., even after the handoff of mobile device 202.

As shown in FIG. 2B, in contrast to the session connection guarantying IP session continuity, a connection not guarantying IP session continuity may not enable mobile device 202 to maintain continuity via the session connection, e.g., when mobile device 202 is handed over between networks. For example, as shown in FIG. 2B, mobility anchor 258 may not provide the routing override for the connection session. According to these embodiments, the session connection may use a communication path 291 being set up with a first IP address associated with router 252, e.g., when mobile device is communicating with the first BS 251. The session connection may have to use a new communication path 292 being set up with a different IP address associated with router 254, e.g., when mobile device 202 is handed off to a second BS 253.

In some demonstrative embodiments, mobile device 202 may perform the functionality of mobile device 102 (FIG. 1), mobility anchor 258 may perform the functionality of mobility anchor 158 (FIG. 1), mobility manager 262 may perform the functionality of mobility manager 162 (FIG. 1), and/or network 280 may perform the functionality of network 180 (FIG. 1).

Figure 3A:
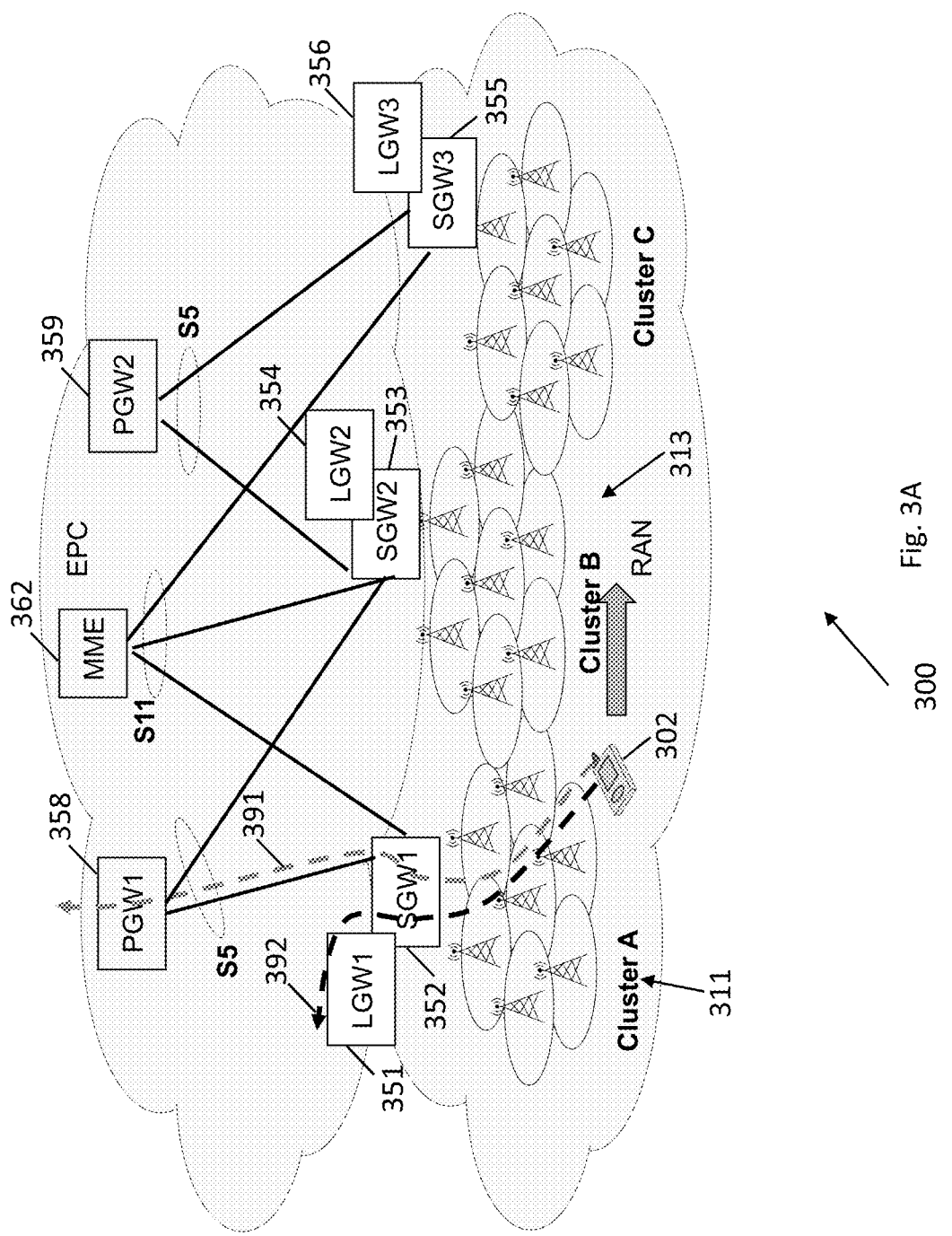
FIG. 3A is a schematic illustration of a first Packet Data Network (PDN) connection guarantying IP session continuity to a User Equipment (UE) via a first gateway, and a second PDN connection not guarantying IP session continuity to the UE via the first gateway.
Figure 3B:
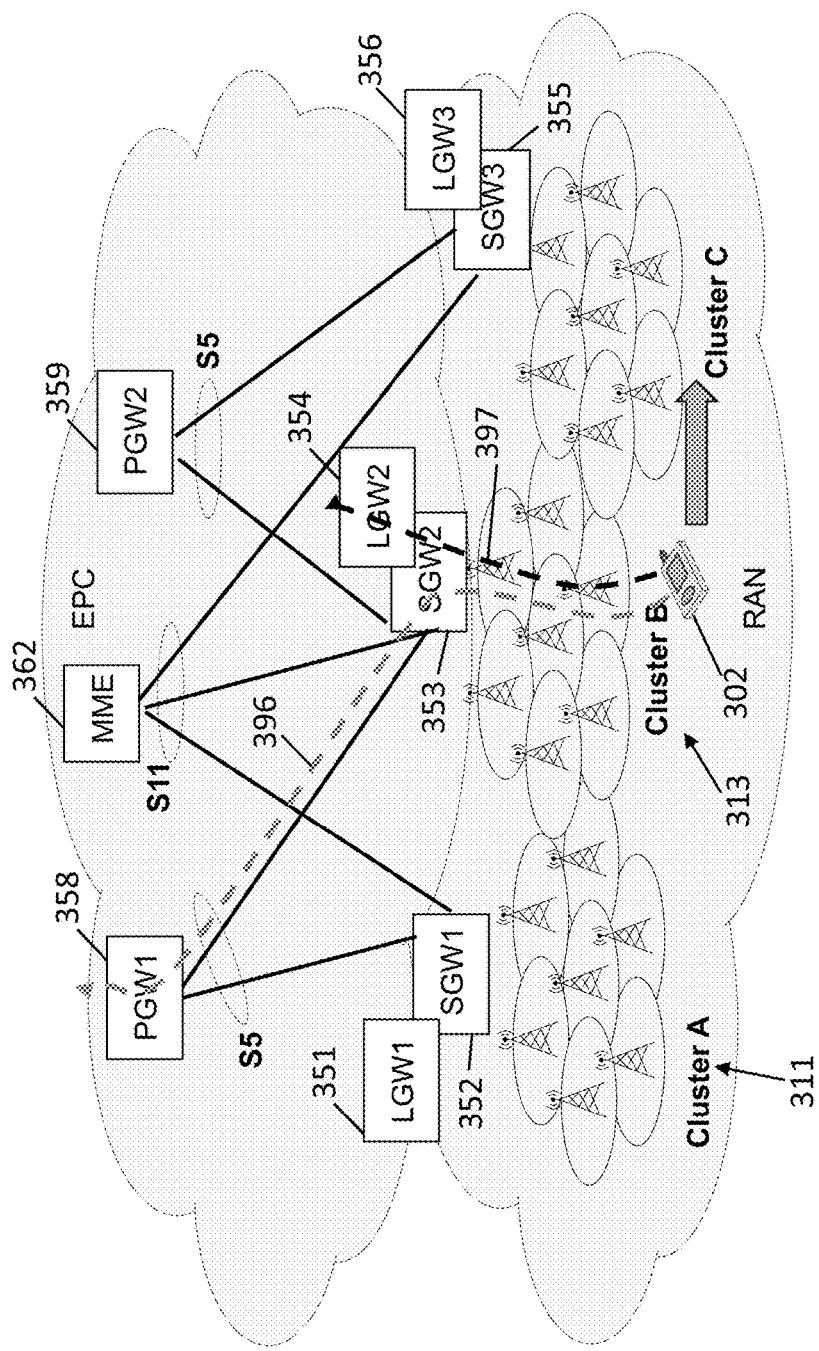
FIG. 3B is a schematic illustration of the first and second PDN connections when the UE moves to coverage of a second gateway, in accordance with some demonstrative embodiments.

Reference is made to FIG. 3A, which schematically illustrates a first Packet Data Network (PDN) connection via a first SGW 352 guarantying IP session continuity to a UE 302, and a second PDN connection via the first SGW 352 not guarantying IP session continuity to the UE 302; and to FIG. 3B, which schematically illustrates the first and second PDN connections when the UE 302 moves to coverage of a second SGW 353, in accordance with some demonstrative embodiments.

In some demonstrative embodiments, FIGS. 3A and 3B may include elements of a LTE system 300, e.g., as described below.

In some demonstrative embodiments, LTE system 300 may implement a Selected IP Traffic Offload at the Local Network (SIPTO@LN) functionality, which may allow for extremely "flat" network deployment. For example, LTE system 300 may include a plurality of LGWs, e.g., including LGWs 351, 354, and 356, which may be associated with a plurality of SGWs, e.g., including SGWs 352, 353, and 355. For example, LGWs 351, 354, and/or 356, be collocated with SGWs 352, 353, and/or 355, respectively.

In some demonstrative embodiments, each of SGWs 352, 353 and 353 may provide access to one or more PGWs of LTE system 300, e.g., including PGWs 358 and 359. In contrast, a SGW may provide access to only one LGW function, e.g., the LGW function collocated with the SGW. For example, SGW 352 may provide access to LGW 351 and to both PGW 358 and 359; SGW 353 may provide access to LGW 358 and to both PGW 358 and 359; and/or SGW 355 may provide access to LGW 356 and to both PGW 358 and 359.

In some demonstrative embodiments, LTE system 300 may also include a MME 362 to manage and/or setup PDN connections for UE 302. For example, UE 302 may perform the functionality of mobile device 102 (FIG. 1), and/or MME 362 may perform the functionality of mobility manager 162 (FIG. 1)

In some demonstrative embodiments, UE 202 may have one or more established PDN connections with one or more PDN networks. A PDN connection may be associated with an IP address, which may be hosted on a mobility anchor, e.g., a PGW or a LGW function.

In some demonstrative embodiments, a PGW functionality may be utilized to establish PDN connections that require IP address preservation, e.g., since the PGW may be located "deep" inside the Evolved Packet Core (EPC) network, and may be accessible from most geographical locations. According to these embodiments, the PGW may be configured to utilize a routing override protocol. For example, PGWs 358 and 359 may perform the functionality of mobility anchor 158 (FIG. 1). In contrast, PDN connections established via a LGW function may not provide IP address preservation, and/or may not be accessible from many locations.

In some demonstrative embodiments, UE 302 may have two established PDN connections for the same service. For example, as shown in FIG. 3A, when UE 302 is within a cell of a first cell cluster 311 ("Cluster A"), UE 302 may communicate via SGW 352. For example, a first PDN connection with IP address preservation may be established for UE 302, e.g., via PGW 358. A second PDN connection without IP address preservation may be established for UE 302, e.g., via LGW 392. For example, the first PDN connection may have a communication path 391, via SGW 352 and PGW 358, and the second PDN connection may have a communication path 392, via SGW 352 and LGW 351.

In some demonstrative embodiments, as shown in FIG. 3B, the SGW function may be relocated to SGW 352, e.g., after UE 302 moves to a cell belonging to a second cell cluster 313 ("Cluster B"). As shown in FIG. 3B, despite the SGW relocation, the first PDN connection, which may have IP address preservation, may be maintained through a communication path 396, via SGW 353 and PGW 358. However, the second PDN connection, which may not have IP address preservation, may need to be re-established through a communication path 397, via SGW 353 and LGW 354. The change in the LGW function, from LGW 352 to LGW 354, may require a change of the IP address for the second PDN connection. This change in the IP address may not enable the IP session continuity via the second PDN connection.

In some demonstrative embodiments, the PDN connections of UE 102 may not be limited by a requirement that all PDN connections for the same PDN need to be terminated on the same PGW or LGW. For example, as shown in FIGS. 3A and 3B, UE 302 may have the first and second PDN connections providing access to the same PDN, while the first PDN connection is terminated at a PGW, e.g., PGW 358, and the second PDN connection is terminated at a LGW, e.g., LGW 351 or LGW 354, as described above.

In some demonstrative embodiments, both the first and second PDN connection may be established, for example, in response to a PDN connection request from UE 302, e.g., in response to each PDN connection request from UE 302. According to these embodiments, and UE 302 may be configured to select whether to use the first PDN connection or the second PDN connection, for example, based on whether or not IP address preservation is required for connecting to the PDN, e.g., as described below.

In some demonstrative embodiments, UE 302 may send a PDN Connection Request message via an eNB of cluster 311, to request to setup a connection for an IP session with a PDN, e.g., network 180 (FIG. 1). The PDN Connection Request message may include, for example, an indication, e.g., as part of an Information Element (IE), to indicate that UE 302 is capable of handling multiple IP addresses assigned to the same service type.

In some demonstrative embodiments, UE 302 may receive a PDN Connection Accept message via the eNB of cluster 311. The PDN Connection Accept message may be generated by MME 362 or any other element of system 100. For example, MME 362 may be configured to set up both a first PDN connection to guarantee IP session continuity and a second PDN connection not guarantying IP session continuity, e.g., in response to each PDN Connection Request from a UE, which is able to handle multiple IP addresses assigned to the same service type.

In some demonstrative embodiments, the PDN Connection Accept message may include, for example, an indication, e.g., as part of an IE, to indicate that two PDN connections have been established for the PDN connection Request.

In some demonstrative embodiments, the PDN Connection Accept message may include, for example, the IP address associated with each of the PDN connections. The PDN Connection Accept message may also include, for example, and indication that a first IP address of the two IP addresses is configured to provide IP address preservation, e.g., to guarantee IP session continuity, and that a second IP address of the two IP addresses is not configured to provide IP address preservation, e.g., not able to guarantee IP session continuity.

In some demonstrative embodiments, UE 302 may be configured to select a PDN connection of the two PDN connections to communicate traffic of the IP session, e.g., based on whether or not IP session continuity is to be maintained for the traffic of the IP session.

In other demonstrative embodiments, UE 302 may indicate, e.g., as part of the PDN connection request, whether the PDN request is to provide IP address preservation or not, and the PDN connection may be set up accordingly, e.g., as described below.

In some demonstrative embodiments, UE 302 may send a PDN Connection Request message via an eNB of Cluster 311 to request to setup a connection for an IP session. The PDN Connection Request message may include, for example, an indication, e.g., as part of an Information Element (IE) of the PDN Request message, to indicate whether the requested PDN connection should be set up with or without IP address preservation. According to these embodiments, MME 362 may setup the PDN connection, e.g., a single PDN connection, according to the indication from UE 302. For example, MME 362 may set up the PDN connection via PGW 358, e.g., if the PDN Connection Request from UE 302 indicates that IP session continuity is to be guaranteed; or MME 362 may set up the PDN connection via LGW 392, e.g., if the PDN Connection Request from UE 302 indicates that IP session continuity is not to be guaranteed.

Figure 4:
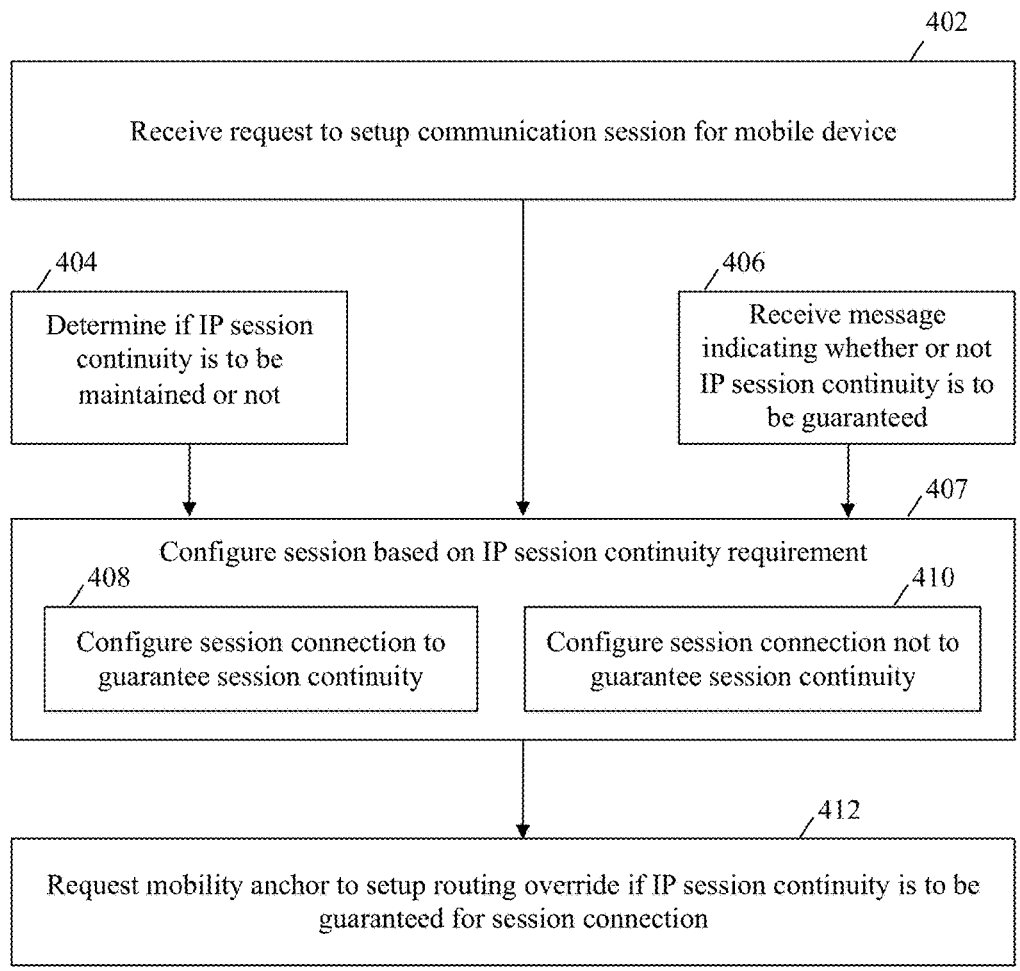
FIG. 4 is a schematic illustration of a method of selectively providing IP session continuity, in accordance with some demonstrative embodiments.

Reference is made to FIG. 4, which schematically illustrates a method of selectively providing IP session continuity, in accordance with some demonstrative embodiments. In some embodiments, one or more of the operations of the method of FIG. 4 may be performed by a wireless communication system e.g., system 100 (FIG. 1); a mobile device, e.g., mobile device 102 (FIG. 1), UE 202 (FIGS. 2A and 2B), UE 302 (FIGS. 3A and 3B); or a mobility manager, e.g., mobility manager 162 (FIG. 1), mobility manager 262 (FIGS. 2A and 2B), or MME 362 (FIGS. 3A and 3B).

As indicated at block 402, the method may include receiving at a mobility manager a request to setup a communication session for a mobile device. For example, interface 164 (FIG. 1) may receive a request to setup an IP session for mobile device 102 (FIG. 1), e.g., as described above.

As indicated at block 404, in some demonstrative embodiments the method may include determining whether or not IP session continuity is to be guaranteed for the communication session. For example, controller 166 (FIG. 1) may determine whether or not IP session continuity is to be guaranteed for the communication session, based on a type of traffic to be communicated during the communication session, based on a type of the mobile device, and/or based on contents of a packet of the communication session, e.g., as described above.

As indicated at block 406, in some demonstrative embodiments the method may include receiving a message indicating whether or not IP session continuity is to be guaranteed for the communication session. For example, interface 164 (FIG. 1) may receive a message indicating whether or not IP session continuity is to be guaranteed for the communication session. The message may include, for example, a message from the mobile device, or a message from a server, which is to communicate with the mobile device during the communication session, e.g., as described above.

As indicated at block 407, the method may include selectively configuring a session connection for the communication session based on the IP session continuity requirement.

As indicated at block 408, the method may include selecting to configure a session connection for the communication session to guarantee IP session continuity, when IP session continuity is to be guaranteed for the communication session. For example, controller 166 (FIG. 1) may select to configure a session connection for the communication session to guarantee IP session continuity, when IP session continuity is to be guaranteed for the communication session, e.g., as described above.

As indicated at block 410, the method may include selecting to configure the session connection without IP session continuity guarantee, when IP session continuity is not to be guaranteed for the communication session. For example, controller 166 (FIG. 1) may select to configure the session connection without IP session continuity guarantee, when IP session continuity is not to be guaranteed for the communication session, e.g., as described above.

As indicated at block 412, the method may include requesting a mobility anchor to setup a routing override for the session connection, only if selecting to configure the session connection to guarantee IP session continuity. For example, controller 166 (FIG. 1) may request mobility anchor 158 (FIG. 1) to setup a routing override for the session connection, e.g., only if selecting to configure the session connection to guarantee IP session continuity, as described above.

Figure 5:
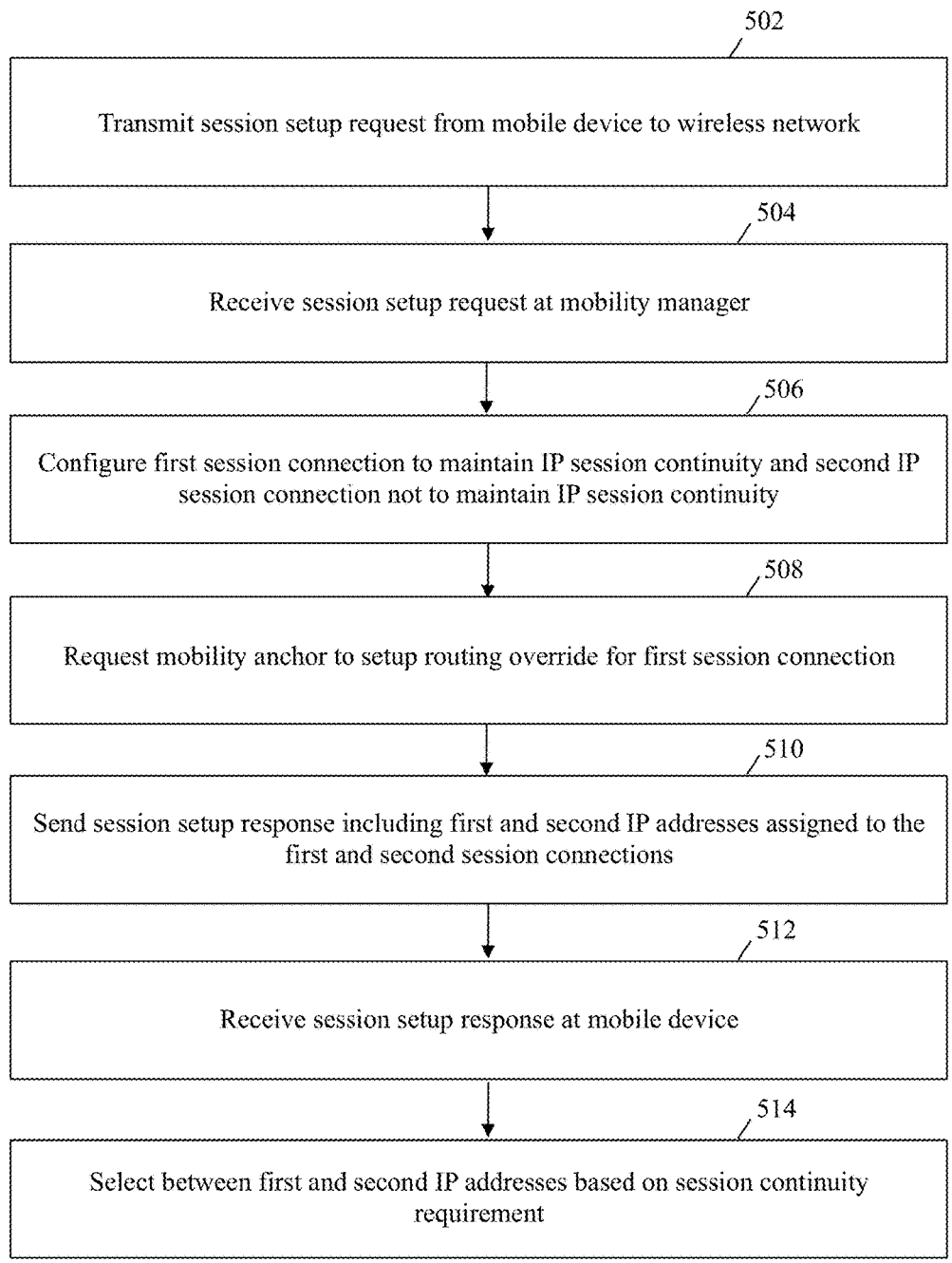
FIG. 5 is a schematic illustration of a method of selectively providing IP session continuity, in accordance with some demonstrative embodiments.

Reference is made to FIG. 5, which schematically illustrates a method of selectively providing IP session continuity, in accordance with some demonstrative embodiments. In some embodiments, one or more of the operations of the method of FIG. 5 may be performed by a wireless communication system e.g., system 100 (FIG. 1); a mobile device, e.g., mobile device 102 (FIG. 1), UE 202 (FIGS. 2A and 2B), UE 302 (FIGS. 3A and 3B); or a mobility manager, e.g., mobility manager 162 (FIG. 1), mobility manager 262 (FIGS. 2A and 2B), or MME 362 (FIGS. 3A and 3B).

As indicated at block 502, the method may include transmitting to a wireless network a session setup request to setup a communication session. For example, radio 143 (FIG. 1) may transmit to access network 150 (FIG. 1) a request to setup a communication session with server 180 (FIG. 1), e.g., as described above.

As indicated at block 504, the method may include receiving the session setup request at a mobility manager. For example, interface 164 (FIG. 1) may receive the session setup request, e.g., as described above.

As indicated at block 506, the method may include configuring a first session connection configured to maintain IP session continuity, and a second session not configured to maintain IP session continuity. The first session connection may be assigned with a first IP address, and the second session connection may be assigned with a second IP address. For example, controller 166 (FIG. 1) may configure the first and second IP addresses, e.g., as described above.

As indicated at block 508, the method may include requesting a mobility anchor to setup a routing override for the first session connection. For example, controller 166 (FIG. 1) may request mobility anchor 158 (FIG. 1) to setup a routing override for the first IP address to guarantee IP session continuity for the first session connection, e.g., as described above.

As indicated at block 510 the method may include sending a session setup response including the first and second IP addresses assigned to the communication session, and an indication that the first IP address is configured to maintain IP session continuity. For example, mobility manager 162 (FIG. 1) may send the session setup response, e.g., as described above.

As indicated at block 512 the method may include receiving at the mobile device the session setup response including the first and second IP addresses assigned to the communication session, and the indication that the first IP address is configured to maintain IP session continuity. For example, radio 143 (FIG. 1) may receive the session setup response, e.g., as described above.

As indicated at block 514, the method may include selecting to use the first IP address for the communication session, if IP session continuity is to be maintained for the communication session, or to use the second IP address for the communication session, if IP session continuity is not to be maintained for the communication session. For example, controller 145 (FIG. 1) may select to use the first IP address, e.g., if IP session continuity is to be guaranteed, or to use the second IP address, e.g., if IP session continuity is not to be guaranteed, e.g., as described above.

Figure 6:
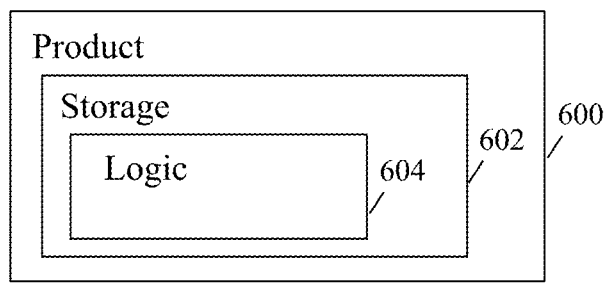
FIG. 6 is a schematic illustration of a product, in accordance with some demonstrative embodiments.

FIG. 6 is a schematic illustration of a product of manufacture, in accordance with some demonstrative embodiments. Product 600 may include a non-transitory machine-readable storage medium 602 to store logic 604, which may be used, for example, to perform at least part of the functionality of mobile device 102 (FIG. 1), mobility manager 162 (FIG. 1), controller 145 (FIG. 1), and/or controller 166 (FIG. 1), and/or to perform one or more operations of the method of FIG. 4 and/or FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising a radio to communicate with a wireless network, the radio to transmit a session setup request to setup a communication session, and to receive a session setup response in response to the session setup request, the session setup response including a first Internet Protocol (IP) address and a second IP address assigned to the communication session, and an indication that the first IP address is configured to maintain IP session continuity; and a controller to select to use the first IP address for the communication session, if IP session continuity is to be maintained for the communication session, and to select to use the second IP address for the communication session, if IP session continuity is not to be maintained for the communication session.

Example 2 includes the subject matter of Example 1, and optionally, wherein the controller is to select between the first and second IP addresses based on one or more attributes of traffic to be communicated during the communication session.

Example 3 includes the subject matter of Example 1 or 2, and optionally, wherein the controller is to select between the first and second IP addresses based on a type of an application to use the communication session.

Example 4 includes the subject matter of any one of Examples 1-3, and optionally, wherein the first and second IP addresses comprise addresses provided by a Dynamic Host Configuration Protocol (DHCP) server.

Example 5 includes the subject matter of any one of Examples 1-4 being a User Equipment (UE), the radio to transmit the session setup request via a first message to an Evolved Node B (eNB), and to receive the session setup response via a second message from the eNB.

Example 6 includes the subject matter of any one of Examples 1-5, and optionally, wherein the first IP address comprises an address of a first Packet Data Network (PDN) connection, and the second IP address comprises an address of a second PDN connection.

Example 7 includes the subject matter of Example 6, and optionally, wherein the first PDN connection is terminated at a first gateway (GW), and the second PDN connection is terminated at a second GW.

Example 8 includes the subject matter of Example 7, and optionally, wherein the first GW comprises a PDN GW (PGW), and the second GW comprises a Local GW (LGW).

Example 9 includes the subject matter of any one of Examples 6-8, and optionally, wherein the session setup request comprises a PDN connection request, and the session setup response comprises a PDN connection response.

Example 10 includes the subject matter of any one of Examples 1-9, and optionally, comprising one or more antennas; a processor; a memory; an input unit; and an output unit.

Example 11 includes a mobility manager in a wireless communication network, the mobility manager comprising an interface to receive a request to setup a communication session for a mobile device; and a controller to select to configure a session connection for the communication session to guarantee Internet Protocol (IP) session continuity, when IP session continuity is to be guaranteed for the communication session, and to select to configure the session connection without IP session continuity guarantee, when IP session continuity is not to be guaranteed for the communication session, wherein the controller is to request a mobility anchor to setup a routing override for the session connection, only if the controller selects to configure the session connection to guarantee IP session continuity.

Example 12 includes the subject matter of Example 11, and optionally, wherein the controller is to determine whether or not IP session continuity is to be guaranteed for the communication session.

Example 13 includes the subject matter of Example 12, and optionally, wherein the controller is to determine whether or not IP session continuity is to be guaranteed for the communication session based on a type of traffic to be communicated during the communication session.

Example 14 includes the subject matter of Example 12 or 13, and optionally, wherein the controller is to determine whether or not IP session continuity is to be guaranteed for the communication session based on a type of the mobile device.

Example 15 includes the subject matter of any one of Examples 12-14, and optionally, wherein the controller is to determine whether or not IP session continuity is to be guaranteed for the communication session, based on contents of a packet of the communication session.

Example 16 includes the subject matter of Example 15, and optionally, wherein the controller is to determine whether or not IP session continuity is to be guaranteed for the communication session based on an IP header of the packet.

Example 17 includes the subject matter of Example 11, and optionally, wherein the interface is to receive a message indicating whether or not IP session continuity is to be guaranteed for the communication session.

Example 18 includes the subject matter of Example 17, and optionally, wherein the message comprises a message from the mobile device.

Example 19 includes the subject matter of Example 17, and optionally, wherein the message comprises a message from a server, which is to communicate with the mobile device during the communication session.

Example 20 includes the subject matter of any one of Examples 11-19 being a Mobility Management Entity (MME), wherein the mobility anchor comprises a Packet Data Network (PDN) Gateway (PGW), and the mobile device comprises a User Equipment (UE).

Example 21 includes the subject matter of any one of Examples 11-20, and optionally, comprising a processor; and a memory.

Example 22 includes a mobility manager in a communication network, the mobility manager comprising an interface to receive a request to setup a communication session for a mobile device; and a controller to configure a first session connection configured to maintain Internet Protocol (IP) session continuity, and a second session not configured to maintain IP session continuity, the first session connection being assigned with a first IP address, and the second session connection being assigned with a second IP address, wherein the controller is to request a mobility anchor to setup a routing override for the first session connection.

Example 23 includes the subject matter of Example 22, and optionally, wherein the first and second IP addresses comprise addresses provided by a Dynamic Host Configuration Protocol (DHCP) server.

Example 24 includes the subject matter of Example 22 or 23 being a Mobility Management Entity (MME), wherein the mobility anchor comprises a Packet Data Network (PDN) Gateway (PGW), and the mobile device comprises a User Equipment (UE).

Example 25 includes the subject matter of any one of Examples 22-24, and optionally, wherein the first IP address comprises an address of a first PDN connection, and the second IP address comprises an address of a second PDN connection.

Example 26 includes the subject matter of Example 25, and optionally, wherein the first PDN connection is terminated at a first gateway (GW), and the second PDN connection is terminated at a second GW.

Example 27 includes the subject matter of Example 26, and optionally, wherein the first GW comprises the PGW, and the second GW comprises a Local GW (LGW).

Example 28 includes the subject matter of any one of Examples 25-27, and optionally, wherein the session setup request comprises a PDN connection request, and the session setup response comprises a PDN connection response.

Example 29 includes the subject matter of any one of Examples 22-28, and optionally, comprising a processor; and a memory.

Example 30 includes a method performed at a mobile device, the method comprising transmitting to a wireless network a session setup request to setup a communication session; receiving a session setup response in response to the session setup request, the session setup response including a first Internet Protocol (IP) address and a second IP address assigned to the communication session, and an indication that the first IP address is configured to maintain IP session continuity; and selecting to use the first IP address for the communication session, if IP session continuity is to be maintained for the communication session, or to use the second IP address for the communication session, if IP session continuity is not to be maintained for the communication session.

Example 31 includes the subject matter of Example 30, and optionally, comprising selecting between the first and second IP addresses based on one or more attributes of traffic to be communicated during the communication session.

Example 32 includes the subject matter of Example 30 or 31, and optionally, comprising selecting between the first and second IP addresses based on a type of an application to use the communication session.

Example 33 includes the subject matter of any one of Examples 30-32, and optionally, wherein the first and second IP addresses comprise addresses provided by a Dynamic Host Configuration Protocol (DHCP) server.

Example 34 includes the subject matter of any one of Examples 30-33, and optionally, wherein the mobile device comprises a User Equipment (UE), the transmitting comprises transmitting the session setup request via a first message to an Evolved Node B (eNB), and the receiving comprises receiving the session setup response via a second message from the eNB.

Example 35 includes the subject matter of any one of Examples 30-34, and optionally, wherein the first IP address comprises an address of a first Packet Data Network (PDN) connection, and the second IP address comprises an address of a second PDN connection.

Example 36 includes the subject matter of Example 35, and optionally, wherein the first PDN connection is terminated at a first gateway (GW), and the second PDN connection is terminated at a second GW.

Example 37 includes the subject matter of Example 36, and optionally, wherein the first GW comprises a PDN GW (PGW), and the second GW comprises a Local GW (LGW).

Example 38 includes the subject matter of any one of Examples 35-37, and optionally, wherein the session setup request comprises a PDN connection request, and the session setup response comprises a PDN connection response.

Example 39 includes a method performed at a mobility manager in a wireless communication network, the method comprising receiving a request to setup a communication session for a mobile device; selecting to configure a session connection for the communication session to guarantee Internet Protocol (IP) session continuity, when IP session continuity is to be guaranteed for the communication session; selecting to configure the session connection without IP session continuity guarantee, when IP session continuity is not to be guaranteed for the communication session; and requesting a mobility anchor to setup a routing override for the session connection, only if selecting to configure the session connection to guarantee IP session continuity.

Example 40 includes the subject matter of Example 39, and optionally, comprising determining whether or not IP session continuity is to be guaranteed for the communication session.

Example 41 includes the subject matter of Example 40, and optionally, comprising determining whether or not IP session continuity is to be guaranteed for the communication session, based on a type of traffic to be communicated during the communication session.

Example 42 includes the subject matter of Example 40 or 41, and optionally, comprising determining whether or not IP session continuity is to be guaranteed for the communication session based on a type of the mobile device.

Example 43 includes the subject matter of any one of Examples 40-42, and optionally, comprising determining whether or not IP session continuity is to be guaranteed for the communication session, based on contents of a packet of the communication session.

Example 44 includes the subject matter of Example 43, and optionally, comprising determining whether or not IP session continuity is to be guaranteed for the communication session based on an IP header of the packet.

Example 45 includes the subject matter of Example 39, and optionally, comprising receiving a message indicating whether or not IP session continuity is to be guaranteed for the communication session.

Example 46 includes the subject matter of Example 45, and optionally, wherein the message comprises a message from the mobile device.

Example 47 includes the subject matter of Example 45, and optionally, wherein the message comprises a message from a server, which is to communicate with the mobile device during the communication session.

Example 48 includes the subject matter of any one of Examples 39-47, and optionally, wherein the mobility manager comprises a Mobility Management Entity (MME), the mobility anchor comprises a Packet Data Network (PDN) Gateway (PGW), and the mobile device comprises a User Equipment (UE).

Example 49 includes a method performed by a mobility manager in a communication network, the method comprising receiving a request to setup a communication session for a mobile device; configuring a first session connection configured to maintain Internet Protocol (IP) session continuity, and a second session not configured to maintain IP session continuity, the first session connection being assigned with a first IP address, and the second session connection being assigned with a second IP address; and requesting a mobility anchor to setup a routing override for the first session connection.

Example 50 includes the subject matter of Example 49, and optionally, wherein the first and second IP addresses comprise addresses provided by a Dynamic Host Configuration Protocol (DHCP) server.

Example 51 includes the subject matter of Example 49 or 50, and optionally, wherein the mobility manager comprises a Mobility Management Entity (MME), the mobility anchor comprises a Packet Data Network (PDN) Gateway (PGW), and the mobile device comprises a User Equipment (UE).

Example 52 includes the subject matter of any one of Examples 49-51, and optionally, wherein the first IP address comprises an address of a first PDN connection, and the second IP address comprises an address of a second PDN connection.

Example 53 includes the subject matter of Example 52, and optionally, wherein the first PDN connection is terminated at a first gateway (GW), and the second PDN connection is terminated at a second GW.

Example 54 includes the subject matter of Example 53, and optionally, wherein the first GW comprises the PGW, and the second GW comprises a Local GW (LGW).

Example 55 includes the subject matter of any one of Examples 52-54, and optionally, wherein the session setup request comprises a PDN connection request, and the session setup response comprises a PDN connection response.

Example 56 includes a product including one or more tangible computer-readable non-transitory storage media comprising computer-executable instructions operable to, when executed by at least one computer processor, enable the at least one computer processor to implement at a mobile device a method comprising transmitting to a wireless network a session setup request to setup a communication session; receiving a session setup response in response to the session setup request, the session setup response including a first Internet Protocol (IP) address and a second IP address assigned to the communication session, and an indication that the first IP address is configured to maintain IP session continuity; and selecting to use the first IP address for the communication session, if IP session continuity is to be maintained for the communication session, or to use the second IP address for the communication session, if IP session continuity is not to be maintained for the communication session.

Example 57 includes the subject matter of Example 56, and optionally, wherein the method comprises selecting between the first and second IP addresses based on one or more attributes of traffic to be communicated during the communication session.

Example 58 includes the subject matter of Example 56 or 57, and optionally, wherein the method comprises selecting between the first and second IP addresses based on a type of an application to use the communication session.

Example 59 includes the subject matter of any one of Examples 56-58, and optionally, wherein the first and second IP addresses comprise addresses provided by a Dynamic Host Configuration Protocol (DHCP) server.

Example 60 includes the subject matter of any one of Examples 56-59, and optionally, wherein the mobile device comprises a User Equipment (UE), the transmitting comprises transmitting the session setup request via a first message to an Evolved Node B (eNB), and the receiving comprises receiving the session setup response via a second message from the eNB.

Example 61 includes the subject matter of any one of Examples 56-60, and optionally, wherein the first IP address comprises an address of a first Packet Data Network (PDN) connection, and the second IP address comprises an address of a second PDN connection.

Example 62 includes the subject matter of Example 61, and optionally, wherein the first PDN connection is terminated at a first gateway (GW), and the second PDN connection is terminated at a second GW.

Example 63 includes the subject matter of Example 62, and optionally, wherein the first GW comprises a PDN GW (PGW), and the second GW comprises a Local GW (LGW).

Example 64 includes the subject matter of any one of Examples 61-63, and optionally, wherein the session setup request comprises a PDN connection request, and the session setup response comprises a PDN connection response.

Example 65 includes a product including one or more tangible computer-readable non-transitory storage media comprising computer-executable instructions operable to, when executed by at least one computer processor, enable the at least one computer processor to implement at a mobility manager a method comprising receiving a request to setup a communication session for a mobile device; selecting to configure a session connection for the communication session to guarantee Internet Protocol (IP) session continuity, when IP session continuity is to be guaranteed for the communication session; selecting to configure the session connection without IP session continuity guarantee, when IP session continuity is not to be guaranteed for the communication session; and requesting a mobility anchor to setup a routing override for the session connection, only if selecting to configure the session connection to guarantee IP session continuity.

Example 66 includes the subject matter of Example 65, and optionally, wherein the method comprises determining whether or not IP session continuity is to be guaranteed for the communication session.

Example 67 includes the subject matter of Example 66, and optionally, wherein the method comprises determining whether or not IP session continuity is to be guaranteed for the communication session, based on a type of traffic to be communicated during the communication session.

Example 68 includes the subject matter of Example 66 or 67, and optionally, wherein the method comprises determining whether or not IP session continuity is to be guaranteed for the communication session based on a type of the mobile device.

Example 69 includes the subject matter of any one of Examples 66-68, and optionally, wherein the method comprises determining whether or not IP session continuity is to be guaranteed for the communication session, based on contents of a packet of the communication session.

Example 70 includes the subject matter of Example 69, and optionally, wherein the method comprises determining whether or not IP session continuity is to be guaranteed for the communication session based on an IP header of the packet.

Example 71 includes the subject matter of Example 65, and optionally, wherein the method comprises receiving a message indicating whether or not IP session continuity is to be guaranteed for the communication session.

Example 72 includes the subject matter of Example 71, and optionally, wherein the message comprises a message from the mobile device.

Example 73 includes the subject matter of Example 71, and optionally, wherein the message comprises a message from a server, which is to communicate with the mobile device during the communication session.

Example 74 includes the subject matter of any one of Examples 65-72, and optionally, wherein the mobility manager comprises a Mobility Management Entity (MME), the mobility anchor comprises a Packet Data Network (PDN) Gateway (PGW), and the mobile device comprises a User Equipment (UE).

Example 75 includes a product including one or more tangible computer-readable non-transitory storage media comprising computer-executable instructions operable to, when executed by at least one computer processor, enable the at least one computer processor to implement at a mobility manager a method comprising receiving a request to setup a communication session for a mobile device; configuring a first session connection configured to maintain Internet Protocol (IP) session continuity, and a second session not configured to maintain IP session continuity, the first session connection being assigned with a first IP address, and the second session connection being assigned with a second IP address; and requesting a mobility anchor to setup a routing override for the first session connection.

Example 76 includes the subject matter of Example 75, and optionally, wherein the first and second IP addresses comprise addresses provided by a Dynamic Host Configuration Protocol (DHCP) server.

Example 77 includes the subject matter of Example 75 or 76, and optionally, wherein the mobility manager comprises a Mobility Management Entity (MME), the mobility anchor comprises a Packet Data Network (PDN) Gateway (PGW), and the mobile device comprises a User Equipment (UE).

Example 78 includes the subject matter of any one of Examples 75-77, and optionally, wherein the first IP address comprises an address of a first PDN connection, and the second IP address comprises an address of a second PDN connection.

Example 79 includes the subject matter of Example 78, and optionally, wherein the first PDN connection is terminated at a first gateway (GW), and the second PDN connection is terminated at a second GW.

Example 80 includes the subject matter of Example 79, and optionally, wherein the first GW comprises the PGW, and the second GW comprises a Local GW (LGW).

Example 81 includes the subject matter of any one of Examples 78-80, and optionally, wherein the session setup request comprises a PDN connection request, and the session setup response comprises a PDN connection response.

Example 82 includes an apparatus comprising means for transmitting to a wireless network a session setup request to setup a communication session; means for receiving a session setup response in response to the session setup request, the session setup response including a first Internet Protocol (IP) address and a second IP address assigned to the communication session, and an indication that the first IP address is configured to maintain IP session continuity; and means for selecting to use the first IP address for the communication session, if IP session continuity is to be maintained for the communication session, or to use the second IP address for the communication session, if IP session continuity is not to be maintained for the communication session.

Example 83 includes the subject matter of Example 82, and optionally, comprising means for selecting between the first and second IP addresses based on one or more attributes of traffic to be communicated during the communication session.

Example 84 includes the subject matter of Example 82 or 83, and optionally, comprising means for selecting between the first and second IP addresses based on a type of an application to use the communication session.

Example 85 includes the subject matter of any one of Examples 82-84, and optionally, wherein the first and second IP addresses comprise addresses provided by a Dynamic Host Configuration Protocol (DHCP) server.

Example 86 includes the subject matter of any one of Examples 82-85 being a User Equipment (UE), the transmitting comprises transmitting the session setup request via a first message to an Evolved Node B (eNB), and the receiving comprises receiving the session setup response via a second message from the eNB.

Example 87 includes the subject matter of any one of Examples 82-86, and optionally, wherein the first IP address comprises an address of a first Packet Data Network (PDN) connection, and the second IP address comprises an address of a second PDN connection.

Example 88 includes the subject matter of Example 87, and optionally, wherein the first PDN connection is terminated at a first gateway (GW), and the second PDN connection is terminated at a second GW.

Example 89 includes the subject matter of Example 88, and optionally, wherein the first GW comprises a PDN GW (PGW), and the second GW comprises a Local GW (LGW).

Example 90 includes the subject matter of any one of Examples 87-89, and optionally, wherein the session setup request comprises a PDN connection request, and the session setup response comprises a PDN connection response.

Example 91 includes an apparatus comprising means for receiving a request to setup a communication session for a mobile device; means for selecting to configure a session connection for the communication session to guarantee Internet Protocol (IP) session continuity, when IP session continuity is to be guaranteed for the communication session; means for selecting to configure the session connection without IP session continuity guarantee, when IP session continuity is not to be guaranteed for the communication session; and means for requesting a mobility anchor to setup a routing override for the session connection, only if selecting to configure the session connection to guarantee IP session continuity.

Example 92 includes the subject matter of Example 91, and optionally, comprising means for determining whether or not IP session continuity is to be guaranteed for the communication session.

Example 93 includes the subject matter of Example 92, and optionally, comprising means for determining whether or not IP session continuity is to be guaranteed for the communication session, based on a type of traffic to be communicated during the communication session.

Example 94 includes the subject matter of Example 92 or 93, and optionally, comprising means for determining whether or not IP session continuity is to be guaranteed for the communication session based on a type of the mobile device.

Example 95 includes the subject matter of any one of Examples 92-94, and optionally, comprising means for determining whether or not IP session continuity is to be guaranteed for the communication session, based on contents of a packet of the communication session.

Example 96 includes the subject matter of Example 95, and optionally, comprising means for determining whether or not IP session continuity is to be guaranteed for the communication session based on an IP header of the packet.

Example 97 includes the subject matter of Example 91, and optionally, comprising means for receiving a message indicating whether or not IP session continuity is to be guaranteed for the communication session.

Example 98 includes the subject matter of Example 97, and optionally, wherein the message comprises a message from the mobile device.

Example 99 includes the subject matter of Example 97, and optionally, wherein the message comprises a message from a server, which is to communicate with the mobile device during the communication session.

Example 100 includes the subject matter of any one of Examples 91-99 being a Mobility Management Entity (MME), the mobility anchor comprises a Packet Data Network (PDN) Gateway (PGW), and the mobile device comprises a User Equipment (UE).

Example 101 includes an apparatus comprising means for receiving a request to setup a communication session for a mobile device; means for configuring a first session connection configured to maintain Internet Protocol (IP) session continuity, and a second session not configured to maintain IP session continuity, the first session connection being assigned with a first IP address, and the second session connection being assigned with a second IP address; and requesting a mobility anchor to setup a routing override for the first session connection.

Example 102 includes the subject matter of Example 101, and optionally, wherein the first and second IP addresses comprise addresses provided by a Dynamic Host Configuration Protocol (DHCP) server.

Example 103 includes the subject matter of Example 101 or 102 being a Mobility Management Entity (MME), the mobility anchor comprises a Packet Data Network (PDN) Gateway (PGW), and the mobile device comprises a User Equipment (UE).

Example 104 includes the subject matter of any one of Examples 101-103, and optionally, wherein the first IP address comprises an address of a first PDN connection, and the second IP address comprises an address of a second PDN connection.

Example 105 includes the subject matter of Example 104, and optionally, wherein the first PDN connection is terminated at a first gateway (GW), and the second PDN connection is terminated at a second GW.

Example 106 includes the subject matter of Example 105, and optionally, wherein the first GW comprises the PGW, and the second GW comprises a Local GW (LGW).

Example 107 includes the subject matter of any one of Examples 104-106, and optionally, wherein the session setup request comprises a PDN connection request, and the session setup response comprises a PDN connection response.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A mobile device comprising:
   a radio to communicate with a wireless network, the radio to transmit a session setup request to setup a communication session, and to receive a session setup response in response to the session setup request, the session setup response comprising a first Internet Protocol (IP) address and a second IP address assigned to the communication session, and an indication that the first IP address is configured to maintain IP session continuity; and
   a controller to select to use the first IP address for said communication session, if IP session continuity is to be maintained for the communication session, and to select to use the second IP address for said communication session, if IP session continuity is not to be maintained for the communication session, said controller is to select between said first and second IP addresses based on one or more attributes of traffic to be communicated during the communication session.

2. The mobile device of claim 1, wherein said first and second IP addresses comprise addresses provided by a Dynamic Host Configuration Protocol (DHCP) server.

3. The mobile device of claim 1, wherein said controller is to select between said first and second IP addresses based on a type of an application to use said communication session.

4. The mobile device of claim 1 being a User Equipment (UE), the radio to transmit said session setup request via a first message to an Evolved Node B (eNB), and to receive the session setup response via a second message from the eNB.

5. The mobile device of claim 1, wherein said first IP address comprises an address of a first Packet Data Network (PDN) connection, and the second IP address comprises an address of a second PDN connection.

6. The mobile device of claim 5, wherein the first PDN connection is terminated at a first gateway (GW), and the second PDN connection is terminated at a second GW.

7. The mobile device of claim 6, wherein the first GW comprises a PDN GW (PGW), and the second GW comprises a Local GW (LGW).

8. The mobile device of claim 5, wherein the session setup request comprises a PDN connection request, and the session setup response comprises a PDN connection response.

9. The mobile device of claim 1 comprising:
   one or more antennas;
   a processor;
   a memory;
   an input unit; and
   an output unit.

10. A mobility manager in a wireless communication network, the mobility manager comprising:
    an interface to receive a request to setup a communication session for a mobile device; and
    a controller to select to configure a session connection for the communication session to guarantee Internet Protocol (IP) session continuity, when IP session continuity is to be guaranteed for the communication session, and to select to configure said session connection without IP session continuity guarantee, when IP session continuity is not to be guaranteed for the communication session, said controller is to determine whether or not IP session continuity is to be guaranteed for the communication session based on a type of traffic to be communicated during the communication session,
    wherein said controller is to request a mobility anchor to setup a routing override for said session connection, only if the controller selects to configure the session connection to guarantee IP session continuity.

11. The mobility manager of claim 10, wherein said controller is to determine whether or not IP session continuity is to be guaranteed for the communication session based on a type of the mobile device.

12. The mobility manager of claim 10, wherein said controller is to determine whether or not IP session continuity is to be guaranteed for the communication session based on an IP header of a packet of said communication session.

13. The mobility manager of claim 10, wherein said controller is to determine whether or not IP session continuity is to be guaranteed for the communication session, based on contents of a packet of said communication session.

14. The mobility manager of claim 10, wherein said interface is to receive a message indicating whether or not IP session continuity is to be guaranteed for the communication session.

15. The mobility manager of claim 10 being a Mobility Management Entity (MME), wherein said mobility anchor comprises a Packet Data Network (PDN) Gateway (PGW), and said mobile device comprises a User Equipment (UE).

16. The mobility manager of claim 10 comprising:
    a processor; and
    a memory.

17. A method to be performed by a mobility manager in a communication network, the method comprising:
    receiving a request to setup a communication session for a mobile device;
    configuring a first session connection configured to maintain Internet Protocol (IP) session continuity, and a second session not configured to maintain IP session continuity, the first session connection assigned with a first IP address, and the second session connection assigned with a second IP address, said first and second IP addresses comprise addresses provided by a Dynamic Host Configuration Protocol (DHCP) server, said first IP address comprises an address of a first Packet Data Network (PDN) connection, and the second IP address comprises an address of a second PDN connection; and
    requesting a mobility anchor to setup a routing override for said first session connection.

18. The method of claim 17, wherein the first PDN connection is terminated at a first gateway (GW) and the second PDN connection is terminated at a second GW, said first GW comprises a PDN Gateway (PGW), and the second GW comprises a Local GW (LGW).

19. The method of claim 17, wherein said mobility manager comprises a Mobility Management Entity (MME), said mobility anchor comprises a PDN Gateway (PGW), and said mobile device comprises a User Equipment (UE).

20. The method of claim 17, wherein said request to setup the communication session comprises a PDN connection request.

21. The method of claim 17, wherein the first PDN connection is terminated at a first gateway (GW), and the second PDN connection is terminated at a second GW.

22. A product comprising one or more tangible computer-readable non-transitory storage media comprising computer-executable instructions operable to, when executed by at least one processor, enable the at least one processor to cause a mobile device to:
   transmit to a wireless network a session setup request to setup a communication session;
   receive a session setup response in response to the session setup request, the session setup response comprising a first Internet Protocol (IP) address and a second IP address assigned to the communication session, and an indication that the first IP address is configured to maintain IP session continuity; and
   select to use the first IP address for said communication session, if IP session continuity is to be maintained for the communication session, or to use the second IP address for said communication session, if IP session continuity is not to be maintained for the communication session, the instructions, when executed, cause the mobile device to select between said first and second IP addresses based on one or more attributes of traffic to be communicated during the communication session.

23. The product of claim 22, wherein the instructions, when executed, cause the mobile device to select between said first and second IP addresses based on a type of an application to use the communication session.

24. The product of claim 22, wherein said mobile device comprises a User Equipment (UE), said instructions, when executed, cause the UE to transmit said session setup request via a first message to an Evolved Node B (eNB), and to receive the session setup response via a second message from the eNB.

25. The product of claim 22, wherein said first IP address comprises an address of a first Packet Data Network (PDN) connection, and the second IP address comprises an address of a second PDN connection.

* * * * *